United States Patent
Kaneko

(10) Patent No.: US 8,023,133 B2
(45) Date of Patent: Sep. 20, 2011

(54) IMAGE FORMING JOB MANAGING APPARATUS, METHOD OF SAME, AND PROGRAM FOR SAME

(75) Inventor: Takayuki Kaneko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1099 days.

(21) Appl. No.: 11/432,751

(22) Filed: May 11, 2006

(65) Prior Publication Data

US 2006/0279781 A1    Dec. 14, 2006

(30) Foreign Application Priority Data

Jun. 10, 2005  (JP) ................................ 2005-171530

(51) Int. Cl.
- G06F 3/12    (2006.01)
- G06F 9/46    (2006.01)
- G06F 3/048   (2006.01)

(52) U.S. Cl. ...... 358/1.15; 358/1.13; 715/769; 715/772; 715/963; 715/965; 718/100; 718/102; 718/103; 718/104; 718/105

(58) Field of Classification Search ................ 358/1.13, 358/1.15; 710/6; 718/102, 103, 104, 105
See application file for complete search history.

(56) References Cited

U.S. PATENT DOCUMENTS

| | | | | |
|---|---|---|---|---|
| 5,940,582 A | * | 8/1999 | Akabori et al. | 358/1.13 |
| 5,970,224 A | * | 10/1999 | Salgado et al. | 358/1.16 |
| 6,816,273 B1 | * | 11/2004 | Kuga et al. | 358/1.15 |
| 6,856,416 B1 | * | 2/2005 | Danknick | 358/1.15 |
| 7,031,014 B2 | | 4/2006 | Ohwa | |
| 2002/0057455 A1 | * | 5/2002 | Gotoh et al. | 358/1.15 |
| 2002/0126307 A1 | * | 9/2002 | Ohwa | 358/1.14 |
| 2004/0070788 A1 | * | 4/2004 | Barry et al. | 358/1.15 |

FOREIGN PATENT DOCUMENTS

| | | |
|---|---|---|
| JP | 11-194911 A | 7/1999 |
| JP | 2000-040099 A | 2/2000 |
| JP | 2002-063003 A | 2/2002 |
| JP | 2002-063004 A | 2/2002 |
| JP | 2002-268846 A | 9/2002 |
| JP | 2004-213380 A | 7/2004 |
| JP | 2004-295602 A | 10/2004 |

* cited by examiner

Primary Examiner — Chan S Park
Assistant Examiner — Vincent Peren
(74) Attorney, Agent, or Firm — Canon USA Inc. IP Division

(57) ABSTRACT

An image forming job management apparatus includes a virtual job assignment unit, a real job assignment unit, and a schedule managing unit. The virtual job assignment unit assigns an image forming job for forming images to a plurality of image forming apparatuses. The real job assignment unit assigns an image forming job for forming images to a single image forming apparatus. The schedule managing unit manages image forming jobs according to a schedule. The schedule is generated by assigning each of the image forming jobs to at least one image forming apparatus using either the virtual job assignment unit or the real job assignment unit.

3 Claims, 21 Drawing Sheets

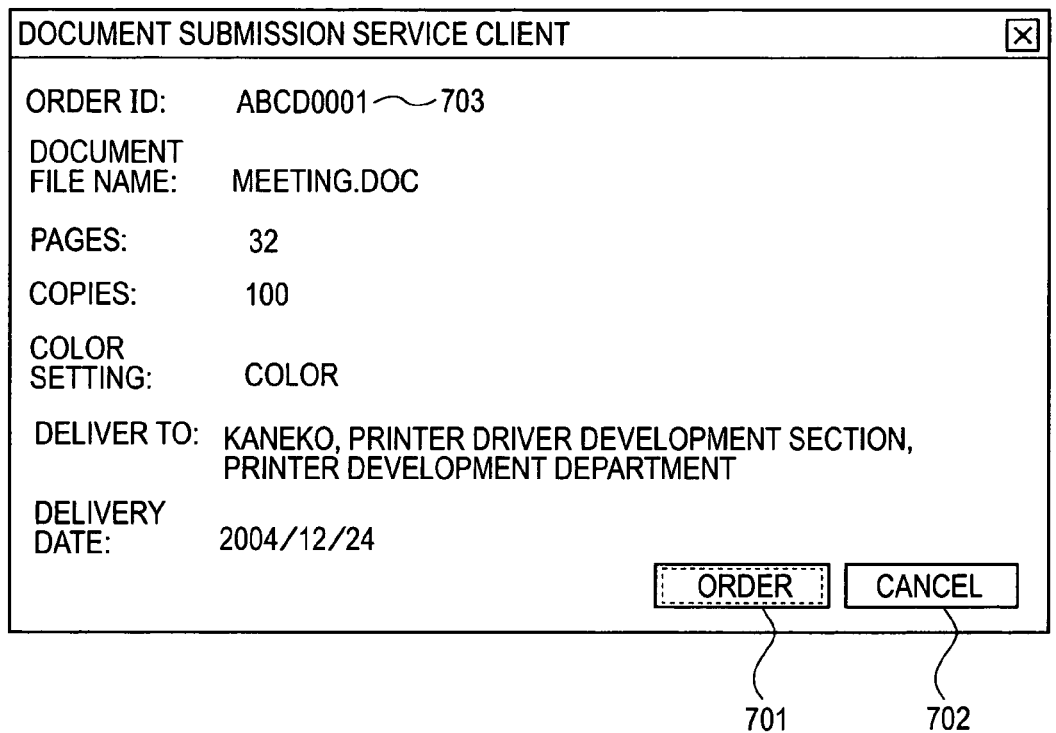

FIG. 10

ORDER MANAGER
FILE  EDIT  DISPLAY  TOOL  HELP

ORDER LIST:

| ORDER ID | USER ID | DOCUMENT FILE NAME | STATUS |
|---|---|---|---|
| ABCD12338 | 11111 | DOCUMENT1.DOC | COMPLETED |
| ABCD12339 | 22222 | DOCUMENT2.DOC | COMPLETED |
| ABCD12340 | 22222 | DOCUMENT3.DOC | COMPLETED |
| ABCD12341 | 11111 | DOCUMENT4.DOC | PROCESSING |
| ABCD12342 | 33333 | DOCUMENT5.DOC | PROCESSING |
| ABCD12343 | 44444 | DOCUMENT6.DOC | UNPROCESSED |
| ABCD12344 | 55555 | DOCUMENT7.DOC | UNPROCESSED |
| ABCD12345 | 12345 | MEETING.DOC | UNPROCESSED |

ORDER INFORMATION :

[PRODUCT INFORMATION]
ORDER ID :              ABCD12345
USER ID :               12345
DOCUMENT FILE NAME:     MEETING.DOC
PAGES:                  32 [PAGES]
COPIES:                 100 [COPIES]
COLOR SETTING:          COLOR PRINTING
DELIVER TO:             KANEKO, PRINTER DRIVER DEVELOPMENT SECTION,
                        PRINTER DEVELOPMENT DEPARTMENT
DELIVERY DATE:          December 24, 2004
[OPERATION INFORMATION]
PRINTER NAME            PRINTER 1113  ⎫
START TIME              9:00          ⎬ —1001
END TIME                10:00         ⎭

END

ORDER MANAGER
FILE  EDIT  DISPLAY  TOOL  HELP

ORDER LIST:

| ORDER ID | USER ID | DOCUMENT FILE NAME | STATUS |
|---|---|---|---|
| ABCD12338 | 11111 | DOCUMENT1.DOC | COMPLETED |
| ABCD12339 | 22222 | DOCUMENT2.DOC | COMPLETED |
| ABCD12340 | 22222 | DOCUMENT3.DOC | COMPLETED |
| ABCD12341 | 11111 | DOCUMENT4.DOC | PROCESSING |
| ABCD12342 | 33333 | DOCUMENT5.DOC | PROCESSING |
| ABCD12343 | 44444 | DOCUMENT6.DOC | UNPROCESSED |
| ABCD12344 | 55555 | DOCUMENT7.DOC | UNPROCESSED |
| ABCD12345 | 12345 | MEETING.DOC | UNPROCESSED |

ORDER INFORMATION :

[PRODUCT INFORMATION]
ORDER ID : ABCD12345
USER ID : 12345
DOCUMENT FILE NAME: MEETING.DOC
PAGES: 32 [PAGES]
COPIES: 100 [COPIES]
COLOR SETTING: COLOR PRINTING
DELIVER TO: KANEKO, PRINTER DRIVER DEVELOPMENT SECTION, PRINTER DEVELOPMENT DEPARTMENT
DELIVERY DATE: December 24, 2004
[OPERATION INFORMATION]
PRINTER NAME  USED VIRTUAL DISTRIBUTED PRINTER
(PRINTER 1113, PRINTER 1114, PRINTER 1115, PRINTER 1116) — 1101

START TIME 9:00
END TIME 10:00

END

```
[Printer Num] ~1301
Real            =6 ~1302a
Virtual         =1 ~1302b
[Real1] ~1303
Printer Name    = PRINTER 111 ~1304
Printer Type    = real ~1305
Color           = monochrome ~1306        1308
Ppm             = 105 ~1307
Comment         = MONOCHROME HIGH-SPEED PRINTER
[Real2] ~1309
Printer Name    = PRINTER 112 ~1310
Printer Type    = real ~1338
Color           = monochrome ~1311        1313
Ppm             = 105 ~1312
Comment         = MONOCHROME HIGH-SPEED PRINTER
[Real3] ~1314
Printer Name    = PRINTER 113 ~1315
Printer Type    = real ~1339
Color           = color ~1316             1318
Ppm             = 64 ~1317
Comment         = COLOR HIGH-SPEED PRINTER
[Real4] ~1319
Printer Name    = PRINTER 114 ~1320
Printer Type    = real ~1340
Color           = color ~1321             1323
Ppm             = 64 ~1322
Comment         = COLOR HIGH-SPEED PRINTER
[Real5] ~1324
Printer Name    = PRINTER 115 ~1325
Printer Type    = real ~1341
Color           = color ~1326             1328
Ppm             = 64 ~1327
Comment         = COLOR HIGH-SPEED PRINTER
[Real6] ~1329
Printer Name    = PRINTER 116 ~1330
Printer Type    = real ~1342
Color           = color ~1331             1333
Ppm             = 64 ~1332
Comment         = COLOR HIGH-SPEED PRINTER
[Virtual1] ~1334
Printer Name    = VIRTUAL DISTRIBUTED PRINTER ~1335
Printer Type    = virtual ~1343
Printer         = Real3,Real4,Real5,Real6 ~1336
```

~1300

| ORDER NAME | PROCESSING TIME | PRIORITY |
|---|---|---|
| ORDER A | 9:00 — 10:00 | LOW |
| ORDER B | 10:00 — 11:00 | LOW |

| ORDER NAME | PROCESSING TIME | PRIORITY |
|---|---|---|
| ORDER C | 9:00 — 10:00 | HIGH |
| ORDER B | 10:30 — 11:00 | LOW |

//  # IMAGE FORMING JOB MANAGING APPARATUS, METHOD OF SAME, AND PROGRAM FOR SAME

BACKGROUND OF THE INVENTION

1. Field of the Invention

The present invention relates to an image forming job managing apparatus, a method for managing image formation, a program for the same. More specifically, the present invention relates to an image forming job managing apparatus, a method for managing image formation, a program for the same capable of realizing a process management apparatus for a printing system configured to output (print and bind) a document.

2. Description of the Related Art

There is a conventional service known as "copy service" or "printing service" in which, in response to an order placed by a client, a predetermined number of copies of a predetermined document is produced and bound in a predetermined style.

When a request for such a printing operation is made, the client mails a document recorded on paper or an electronic medium (flexible disk (FD), magneto-optical disk (MO), compact disk read only memory (CD-ROM) or the like) to a company providing the printing service (i.e., service provider) together with a print instruction including information such as the number of copies to print, the binding style, and the delivery date (this process may be referred to as "new document submission"). There is also a submission system provided by service providers through the Internet in which the user can submit an electronic document using, for example, a browser program. Furthermore, there is a system in which the client can contact the service provider by, for example, telephone to assign a document that has been previously printed and stored by the service provider and the number of copies to be reprinted (this process may be referred to as "repeated submission").

When the service provider receives various orders from specified and unspecified users, the service provider determines the processing order and the processing schedules of these orders (work assignment, scheduling) on the basis of the number of copies to be produced, the delivery date of the copies, and limitations on man power and material resources. Then, according to the determined schedule, the submitted document is read with a copy machines or a scanner (when the document is a hard copy) or printed out with a printer connected to a personal computer (when the document is an electronic document). The produced copies are checked, collated, and, finally, delivered to the client.

However, such a scheduling method for work assignment is not always efficient. In particular, when a problem occurs during any of the steps in the document production process has to be rescheduled, requiring many extra man-hours by the persons involved with the job. To solve such a problem, process management apparatuses configured to automatically determine work schedules and to assign work to the appropriate personnel are currently in use.

An example of such a known printing process management apparatus is disclosed in Japanese Patent Laid-Open No. 2000-40099. Here, the process management apparatus has a resource assignment function in which jobs to be processed are stored in queue and processed in order of priority.

Japanese Patent Laid-Open No. 2002-63003 discloses a process management apparatus having a job assignment function capable of assigning jobs, if necessary, to a plurality of resources so that distributed processing can be carried out for the jobs while taking into consideration the availability of the resources used for processing and the delivery date of the product.

Japanese Patent Laid-Open No. 2002-63004 discloses a process management apparatus having a function that allows the schedules concerning the entire printing system to be grasped intuitively and allows the processing dates of the printing jobs or the object to be processed to be changed by intuitive operation.

The aforementioned known process management apparatuses described above have disadvantages in that, when a job that has to be processed urgently is received once a schedule is assigned appropriately, the entire schedule has to be manually reassigned or, even when the job is assigned to a plurality of resources for processing, the delivery date may have to be to be postponed. Such problems may be solved by placing priority on urgent jobs. However, each time an urgent job is received, the priority of the job must be set, causing a reduction in the work efficiency.

SUMMARY OF THE INVENTION

By taking into consideration, the above-identified problems, the present invention provides an image forming job managing apparatus, a method for managing image formation, and program for the same that allows a schedule for an image formation job to be changed easily so that schedule management is achieved through easy operation.

One aspect of the present invention provides an imaging forming job management apparatus including a virtual job assignment unit configured to assign an image forming job for forming images to a plurality of image forming apparatuses, the image forming job being a virtual image forming job for forming images using an image forming apparatus group including the plurality of image forming apparatuses, a real job assignment unit configured to assign an image forming job for forming images to a single image forming apparatus, the image forming job being a real image forming job for forming images using a single image forming apparatus, and a schedule managing unit configured to manage image forming jobs according to a schedule, the schedule being generated by assigning each of the image forming jobs to at least one image forming apparatus using either the virtual job assignment unit or the real job assignment unit.

Another aspect of the present invention provides a method of managing image forming jobs including assigning an image forming job for forming images to a plurality of image forming apparatuses, the image forming job being a virtual image forming job for forming images using an image forming apparatus group including the plurality of image forming apparatuses, assigning an image forming job for forming images to a single image forming apparatus, the image forming job being a real image forming job for forming images using a single image forming apparatus, and managing image forming jobs according to a schedule, the schedule being generated by assigning each of the image forming jobs to at least one image forming apparatus using either the virtual job assignment unit or the real job assignment unit.

Another aspect of the present invention provides an image forming job management apparatus configured to generate schedule information by scheduling orders to be processed by a printer capable of communication, the apparatus including a first assigning unit configured to assign a first order to a predetermined time and a predetermined printer, a schedule determining unit configured to determine whether a second order is assigned to the predetermined time and the predetermined printer, an order attribute determining unit configured to determine whether or not the second order has been assigned to the predetermined time and the predetermined printer by the first assigning unit when the schedule determining unit determines that a second order is assigned to the predetermined time and the predetermined printer, and a schedule generating unit configured to generate schedule information so as to process the first order at the predetermined time with the predetermined printer, the first order being assigned to the predetermined time and the predetermined printer by the first assigning unit, and to generate schedule information so as to change the predetermined time and the predetermined printer to which the second order is assigned, the second order not being assigned to the predetermined time and the predetermined printer, when the order attribute determining unit determines that a second order is already assigned to the predetermined time and the predetermined printer, the second order not being assigned to the predetermined time and the predetermined printer.

Another aspect of the present invention provides a method of managing image forming jobs for generating schedule information by scheduling orders to be processed by a printer, the method including A) assigning a first order to a predetermined time and a predetermined printer, B) determining whether a second order is assigned to the predetermined time and the predetermined printer, C) determining whether or not the second order has been assigned to the predetermined time and the predetermined printer in step A when step B determines that a second order is assigned to the predetermined time and the predetermined printer, D) generating schedule information so as to process the first order at the predetermined time with the predetermined printer, the first order being assigned to the predetermined time and the predetermined printer in step A, and generating schedule information so as to change the predetermined time and the predetermined printer to which the second order is assigned, the second order being assigned to the predetermined time and the predetermined printer in a step other than step A, when step C determines that a second order is already assigned to the predetermined time and the predetermined printer, the second order being assigned to the predetermined time and the predetermined printer in a step other than step A.

Further features of the present invention will become apparent from the following description of exemplary embodiments (with reference to the attached drawings).

BRIEF DESCRIPTION OF THE DRAWINGS

FIG. 7 illustrates another exemplary file submission screen according to an embodiment of the present invention.

FIG. 8 illustrates an exemplary job ticket screen according to an embodiment of the present invention.

FIG. 10 illustrates an exemplary order manager screen (real printer) according to an embodiment of the present invention.

FIG. 11 illustrates an exemplary order manager screen (virtual printer) according to an embodiment of the present invention.

FIG. 13 illustrates exemplary printer information according to an embodiment of the present invention.

DESCRIPTION OF THE EMBODIMENTS

Numerous embodiments, features and aspects of the present invention will now be described below with reference to the drawings.

As described in detail below, according to an embodiment of the present invention, the user uploads printing document data (hereinafter simply referred to as the "document") to a print server connectable via a communication network, and the operator in charge of printing at the printing facility (hereinafter simply referred to as the "operator") uses the service provided by the print server to specify the print style and delivery date. The present invention provides an image forming job managing apparatus, a method for managing image formation, and a program for the same capable of realizing a process management apparatus for a printing system configured to output (print and bind) a document. Accordingly, the aforementioned provide a printing system configured to output a document in accordance with the specified print style and deliver this document to the user by the delivery date.

Figure 1:
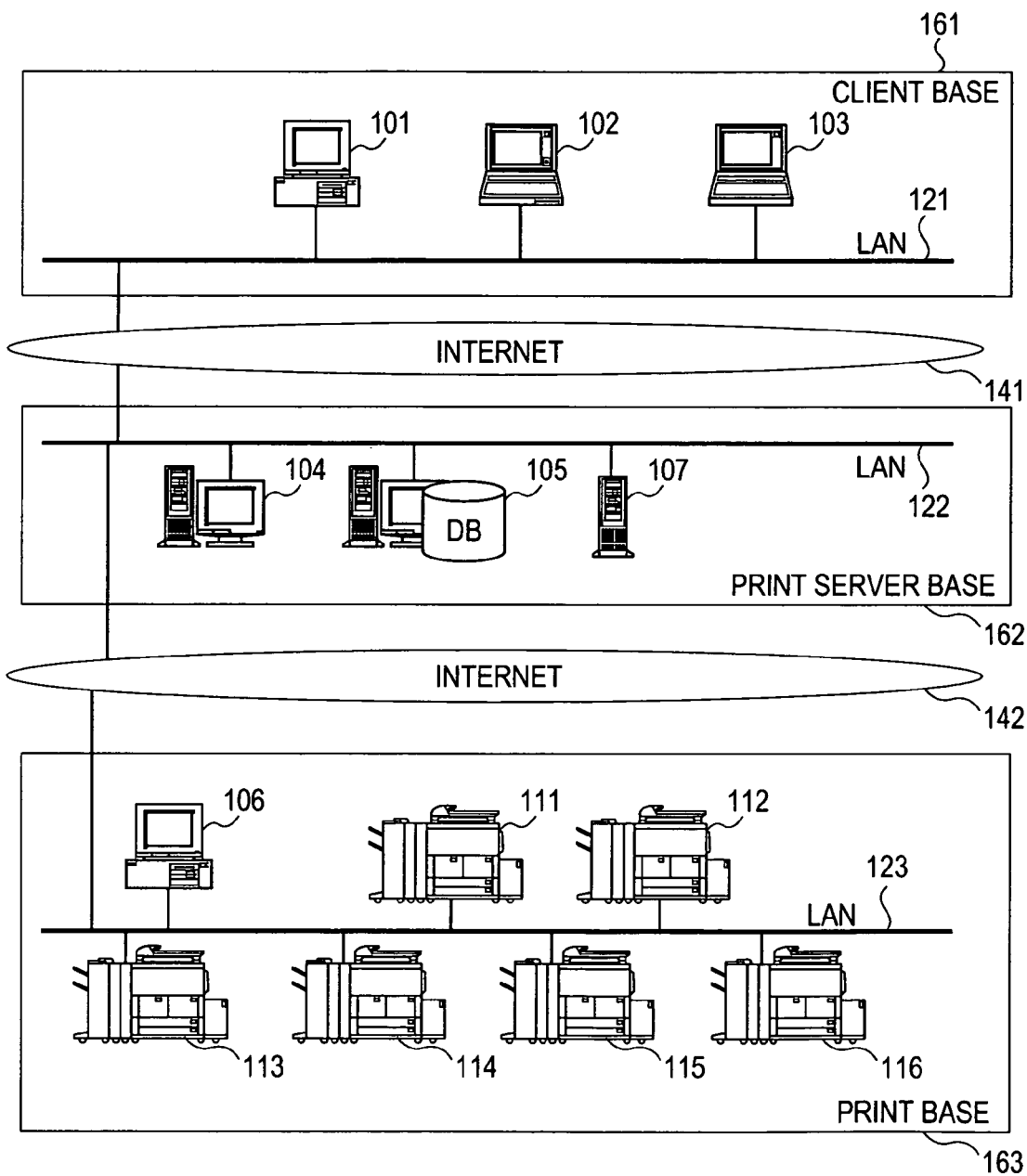
FIG. 1 illustrates an exemplary topology of a network according to an embodiment of the present invention.

FIG. 1 illustrates an exemplary network topology employed in the embodiments present invention. The network topology shown in FIG. 1 includes at least three bases on the network, i.e., a client base 161, a print server base 162, and a print base 163. The client base 161 includes at least one client personal computer (PC) or the like (e.g., this client PC may also be a word processing apparatus or a game apparatus including a communication device). The client PC includes a communication device connectable to the Internet and a peripheral device capable of using at least the function provided by a print server according this embodiment. The client base 161 is not limited and may be any type of system using a local area network (LAN) in an office or a home-use information apparatus.

The print server base 162 includes at least the print server according to this embodiment. The print server includes a communication device connectable to a specified (or an unspecified) client PC via the Internet 142. The print base 163 includes at least one printing device and a manager PC 106 configured to manage related to the printing process carried out at the print base 163. When the printing device provided at the print base 163 is directly connectable to the Internet 142, the print job sent via the Internet 142 can be directly processed. The manager PC 106 includes a communication unit capable of accessing the print server via the Internet 142. The print base 163 is, for example, a print base included in an intranet print-on-demand (POD) system or a centralized reprographic department.

In FIG. 1, a desktop PC 101, a notebook PC 102, and a word processing device 103 (which are simply referred to as "client PCs") are connectable to a print server 104 via a local area network LAN 121 and the Internet 141. They each have a browser function and are capable of issuing various commands to the print server 104. The user can use any of these client PCs 101, 102, and 103 to upload a predetermine document to the print server 104 and place an order for printing and binding (hereinafter simply referred to as an "order") by specifying the printing style, the delivery date, and the delivery destination through a document submission screen provided by the print server 104. The client PCs 101, 102, and 103 use a predetermined protocol to communicate with the print server 104 and carry out various processes required for log-in, management of communication sessions, network communication, and security management.

As mentioned, the client PCs 101, 102, and 103 are connected to a local area network (LAN) 121 that enables connection with an external network via the Internet 141. The client PCs 101, 102, and 103 may be capable of mutual communication with the print server 104 by downloading a JAVA® applet for document submission from the print server 104 or may use technologies developed by Macromedia Incorporated, such as Flash Remoting, Flash, and ActionScript to receive processing synchronously or asynchronously with frontend/backend systems. Instead, it is also possible for the client PCs 101, 102, and 103 to pole the print server 104 so that the client PCs 101, 102, and 103 appear as though they are accessing the active information in the print server 104 at real time. According to this embodiment, the communication protocol and communication technology are not limited. Hereinafter, it is assumed that mutual communication between the client PCs 101, 102, and 103 and the print server 104 is established.

The print server 104 includes a communication unit capable of providing a service via the Internet and controls the connection between the client PCs 101, 102, and 103. A web application server (WAS) technology is used to provide the printing service and to link to a backend system, such as a database (DB) or an authentication system. However, since the method of linking with systems for account management, security management, DB linkage, and an intranet mission-critical system is not the main element of this embodiment, descriptions thereof are omitted. A LAN 122, which the print server 104 is connected to, connects to an external network via the Internet 141 and 142.

A desktop PC (or may be a word processing device) 106 (hereinafter referred to as a "manager PC 106") disposed in the print base 163 is connectable to the print server 104 via the Internet and is capable of downloading documents uploaded from the client PCs 101, 102, and 103 and performing functions such as document management, printing instruction, delivery management, and schedule editing. High quality color multi-function peripheral devices (MFPs) 111, 112, and 113 that are multi-function copy machines capable of scanning, printing, and sending facsimiles and often include a finisher device for stapling and punching are hereinafter referred to as "printers 111, 112, and 113." The printers 111, 112, and 113 each include a finisher that staple finishing and punching finishing. The printers 111, 112, and 113 are capable of high quality printing and receiving printing requests from the manager PC 106. A LAN 123, which the manager PC 106 and the printers 111, 112, and 113 are connected to, is connected to an external network via the Internet 142.

As shown in FIG. 1, the client base 161, the print server base 162, and the print base 163 are configured on different networks (i.e., LANs). However, the client base 161, the print server base 162, and the print base 163 may be configured on the same network in other scenarios. The Internet 141 and the Internet 142 may be either different networks or the same network. In general, the connection between a LAN and the Internet is established via gateways, firewalls, and routers. However, since these components do not constitute the gist of this embodiment, descriptions thereof are omitted.

As shown in FIG. 1, the client base 161, the print server base 162, and the print base 163 establish a 1:1:1 relationship. However, the actual system does not necessarily have to establish such a relationship. Furthermore, the print server base 162 is capable of linking to other systems, such as a database system 105 and an authentication server, when required. However, since such linkage is not important to this embodiment, descriptions thereof are omitted. According to the descriptions above, a document is submitted by uploading electronic data from a client PC. However, the method of document submission is not limited, and other submission methods, such as submission of a hard copy and submission of a recording medium (i.e., submitting a CD-ROM, a flexible disk, or the like on which the document data is stored) may be employed.

Figure 2:
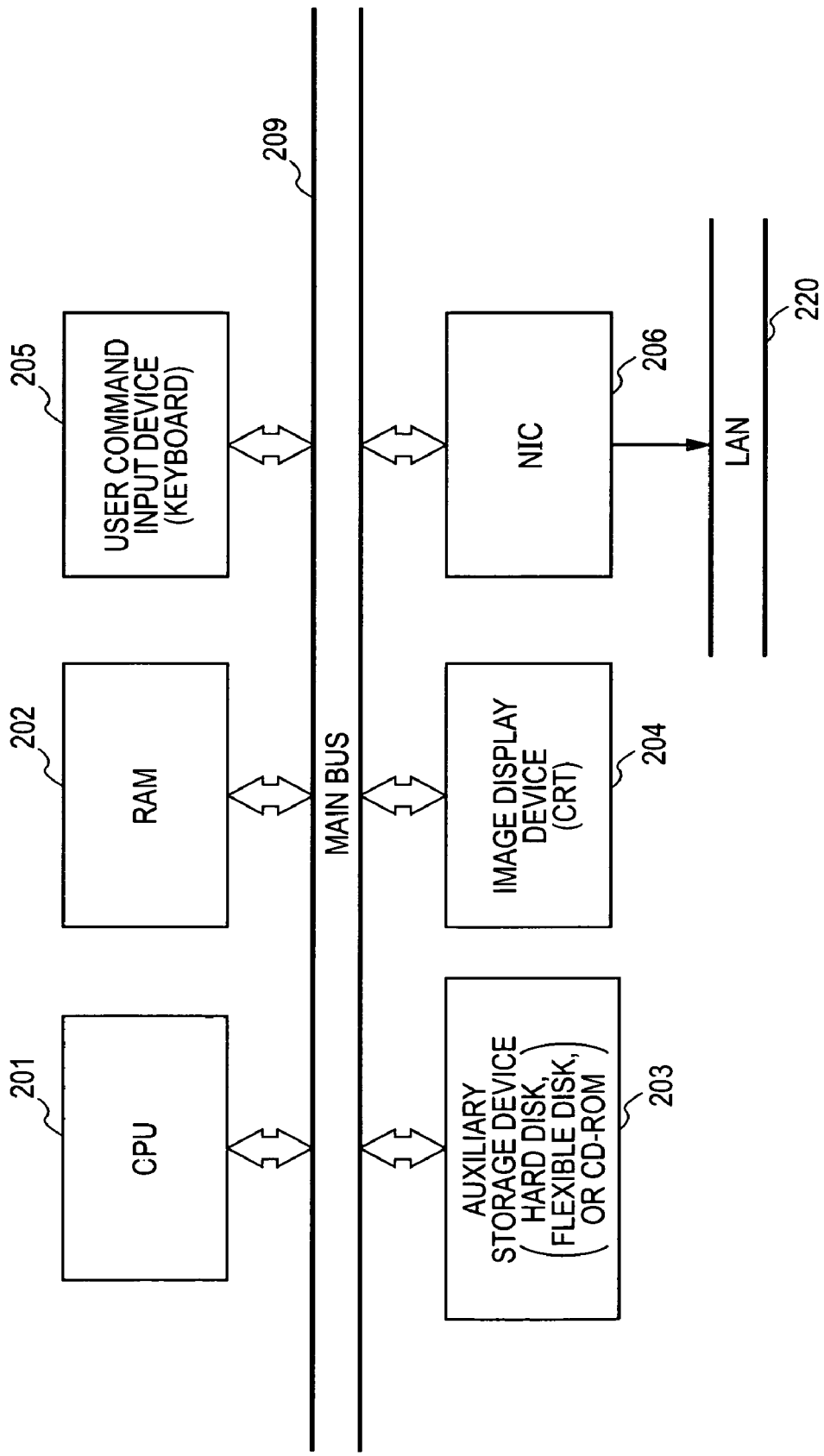
FIG. 2 is illustrates an exemplary architecture of a typical personal computer (PC) according to an embodiment of the present invention.

FIG. 2 illustrates an exemplary architecture of a typical PC that is utilized with the client PCs 101, 102, and 103, the print server 104, and the manager PC 106, shown in FIG. 1. The architecture shown in FIG. 2 includes a central processing unit (CPU) 201 configured to employ and control the method according to this embodiment, a random access memory (RAM) 202 configured to provide a work area for the CPU 201, an auxiliary storage device (hard disk, flexible disk, or CD-ROM) 203 configured to provide a communication program according to this embodiment, an image display device (more specifically, a cathode ray tube (CRT) display or a dual-scan super twisted nematic (DSTN) liquid crystal display) 204 used to display messages addressed to the user, a user command input device (more specifically, a mouse or a keyboard) 205 configured to allow the user to input a command, a network interface (NIC) 206 configured to exchange data with other information devices via a LAN 220, and a main bus 209. The user command input device 205 and the image display device 204 are not mandatory for the print server 104 according to this embodiment. The LAN 220 has a similar configuration as the LANs 121, 122, and 123 shown in FIG. 1.

Figure 3:
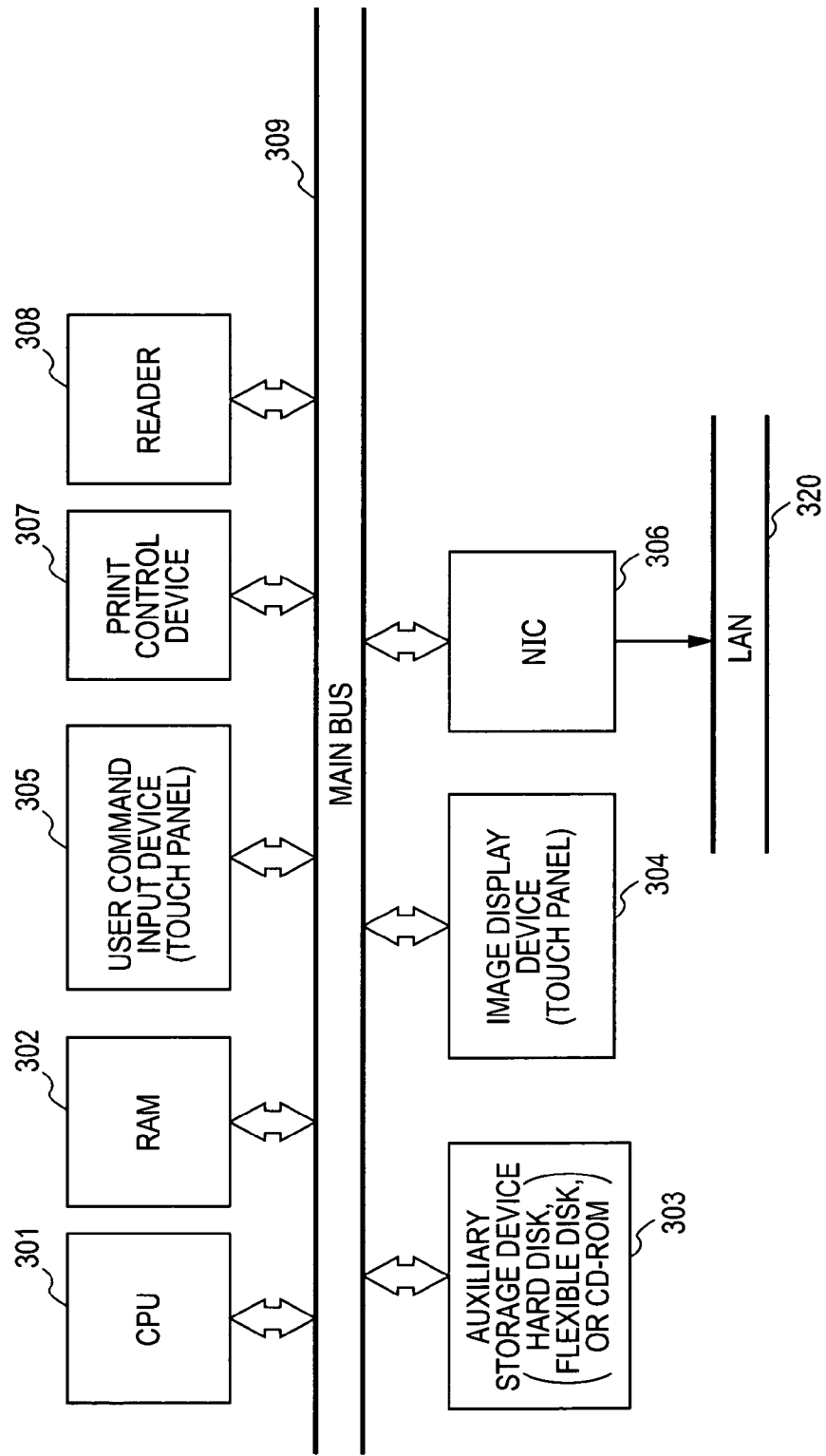
FIG. 3 illustrates an exemplary architecture of a printer according to an embodiment of the present invention.

FIG. 3 illustrates an exemplary architecture of the printers 111, 112, and 113. The architecture shown in FIG. 3 includes a CPU 301 configured to interpret the print data received from the PC and to control the printing and finishing, a RAM 302 configured to provide a work area for the CPU 301 and to temporarily store the print data, and an auxiliary storage device (more specifically, a hard disk or a CD-ROM) 303 used to temporarily store the print data or used instead of the RAM 302 when instructed by the CPU 301. An image display device 304, such as a touch panel, can be used to display error messages and the condition of the printer. A user command input device (touch panel) 305 is provided to allow the user to input instructions such as the number of copies to produce, magnification, and cancellation of the printing. A network interface card (NIC) 306 is provided to exchange data with a network apparatus via a LAN 320. The apparatuses 304 and 305 may be provided as a single module, such as a touch panel.

A print control device 307 configured to print out print data sent from the PC on paper. The print control device 307 according to this embodiment also controls the finisher. An image reader 308 is configured to read an image on a printed out document and digitalize the image into black and white (or color) binary image data. The LAN 320 according to this embodiment has the same configuration as the LAN 123. Additionally, a main bus 309 is provided for communications between the aforementioned components 301 through 308. An interface according to this embodiment, as shown in FIG. 3, that enables data transmission to and reception from the PC is the NIC 306. However, the interface is not limited and may be a parallel interface, a serial interface, or a universal serial bus (USB).

Figure 4:
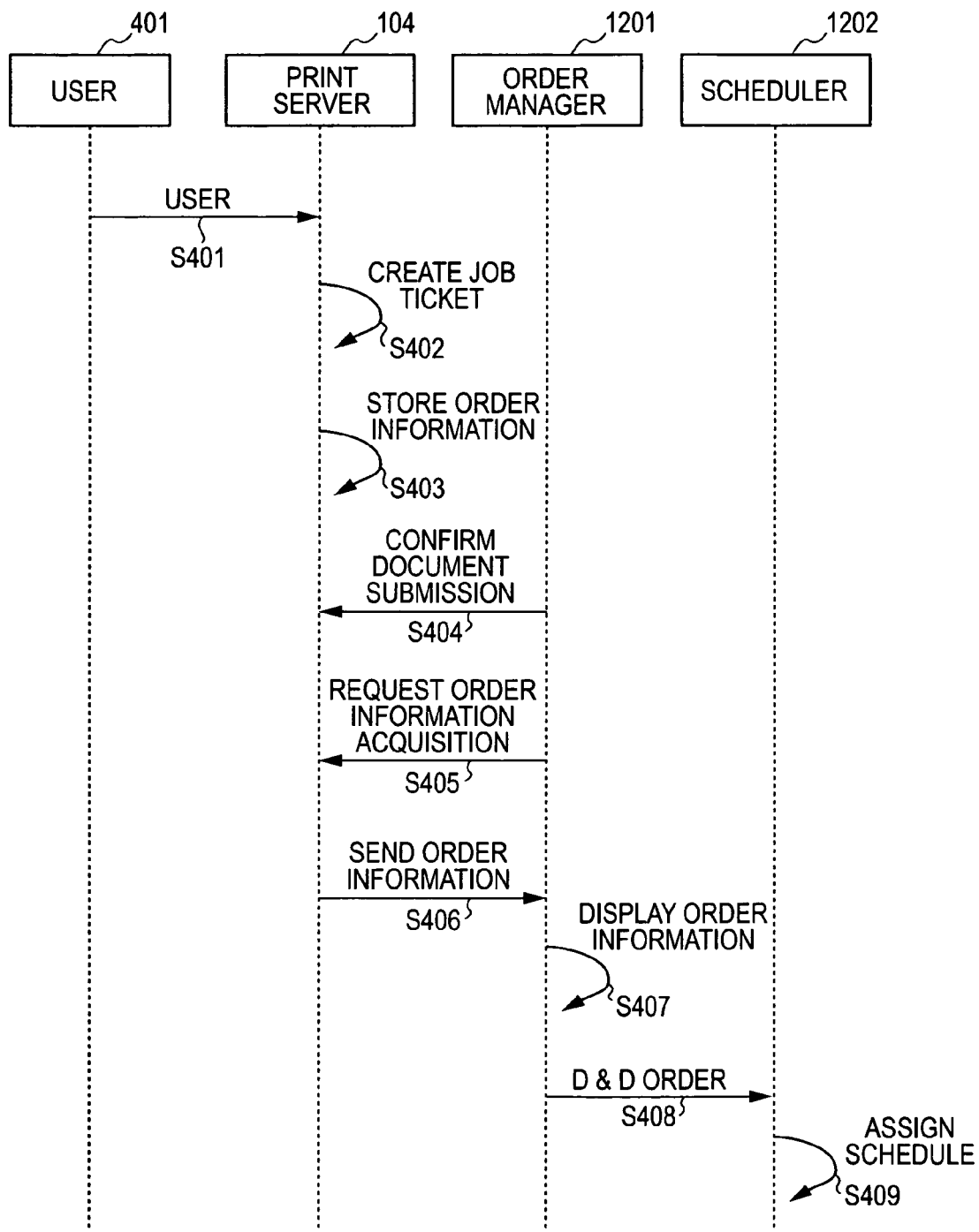
FIG. 4 illustrates a flow diagram of a general overview of an exemplary processing sequence according to an embodiment of the present invention including document submission, ordering, order management, and schedule management.

FIG. 4 illustrates a flow diagram of a general overview of an exemplary processing sequence including steps of submitting a document, placing an order, managing an order, and managing the overall schedule. An order manager 1201 and a scheduler 1202 are output based application software that operates on the manager PC 106 included in the print base 163. The order manager 1201 is capable of managing various processing steps, such as managing the submitted document, of the processing carried out at the print base 163. The scheduler 1202 links with the order manager 1201 to provide a schedule management function. An overview of an exemplary ordering process will be described with reference to FIG. 4, and details of the order manager 1201 and the scheduler 1202 will be described further below.

As shown in FIG. 4, first, a user 401 submits a document to the print server 104 (S401). Once the document is submitted, the print server 104 writes information, such as the print style, delivery destination, and delivery date, set by the user 401 in a job ticket (S402). The information written in the job ticket is linked to the document submitted in Step S401 and stored on the RAM 202 as order information (S403). The job ticket can be referred to and edited at a predetermined timing from the service program operating on the manager PC 106 and from the order manager 1201 and the scheduler 1202 operating on the manager PC 106, wherein such timing and processing are carried out by the CPU 201. The job ticket is also stored on the RAM 202.

The order manager 1201 checks the submission of an order by periodically communicating with the print server 104. Upon detection of the submission of an order (S404), the order manager 1201 requests the print server 104 to obtain the order information (a set of information including the document data and the job ticket information) (S405). In response, the print server 104 transmits the order information to the order manager 1201 (S406). More specifically, since the order information is stored on the RAM 202 of the print server 104, the print server 104 reads out the order information from the RAM 202 and then transmits the order information.

Upon reception of the order information in Step S406, the order manager 1201 displays this order information on the image display device 204 (S407). The received order information is stored on the RAM 202 of the manager PC 106. The order manager 1201 recognizes a drag and drop (D&D) operation of order information process carried out by the operator (S408). More specifically, the order manager 1201 recognizes the process carried out when the operator drags and drops (D&D) an unscheduled order included in the displayed order information onto the scheduler 1202. When the order is dragged and dropped onto the scheduler 1202, the scheduler 1202 prepares an appropriate schedule by carrying out schedule management (S409). Since the method of schedule management employed in Step S409 characterizes this embodiment of the present invention, details are described below. The schedule prepared in Step S409 is stored in the RAM 202 of the manager PC 106.

When the schedule is set, the operator confirms the schedule and starts the output process (printing and binding). According to this embodiment, when the document submission process (S401) and the job ticket production (S402) are carried out, information on at least the order identification (ID), the number of pages of the document, the number of copies of the document to be produced, the color attribute of the output document, and the delivery date is included in the job ticket. The order ID is a unique ID issued to the order by the print server 104 so that the order can be uniquely identified by the print server 104, the order manager 1201, and the scheduler 1202 at predetermined timings.

Figure 12:
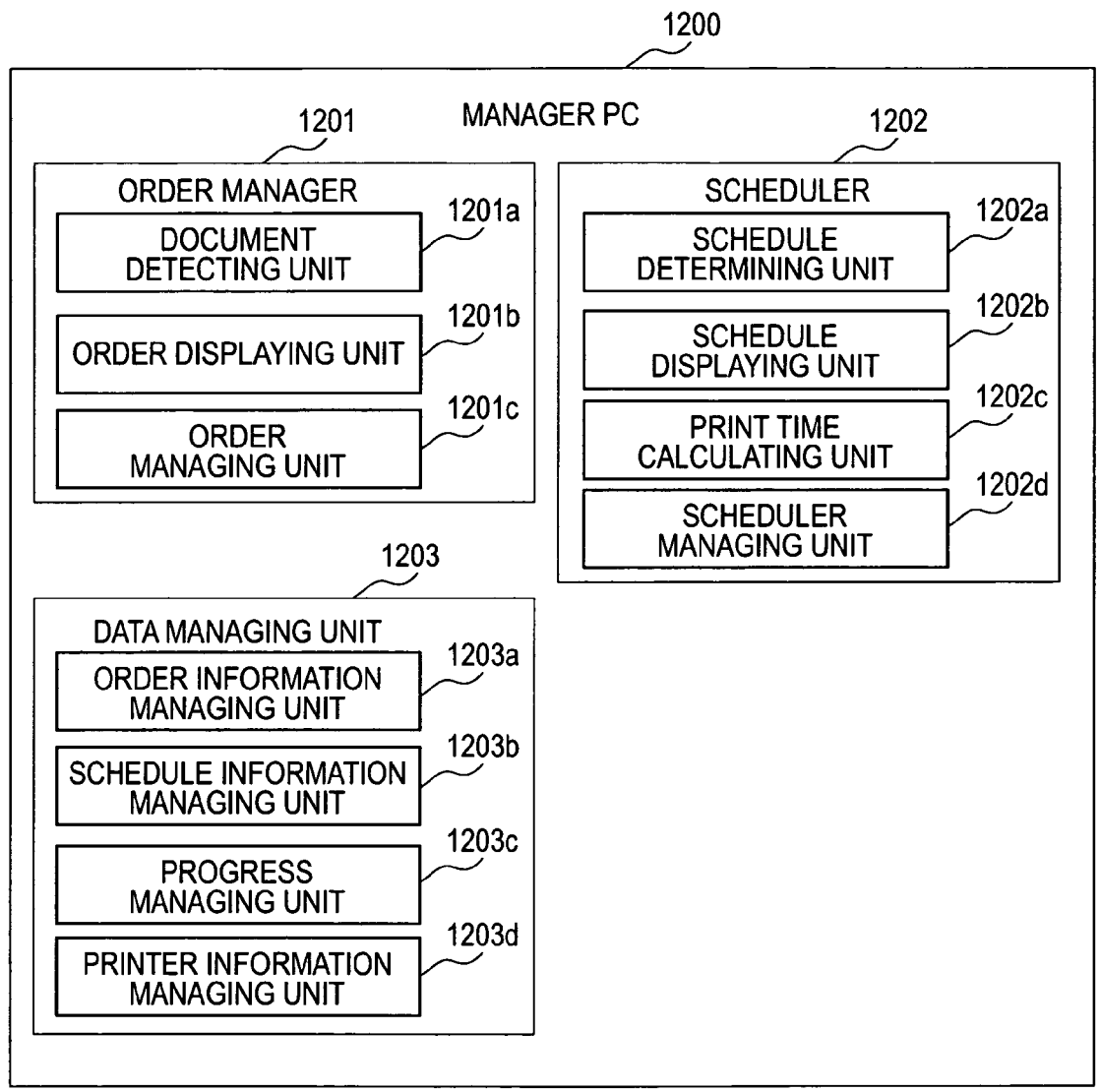
FIG. 12 illustrates an exemplary software configuration according to an embodiment of the present invention.

FIG. 12 illustrates an exemplary configuration 1200 of the software operated on the manager PC 106 included in the print base 163. The order manager 1201, the scheduler 1202, and a data managing unit 1203 included in the manager PC 106 are configured so that they may communicate with each other.

The order manager 1201 manages the submitted order information. An order management information unit 1201a periodically communicates with the print server 104 to check whether a new order is submitted. An order display unit 1201b displays detailed order information and a list of orders. An order managing unit 1201c is linked to the scheduler 1202 or the data managing unit 1203 to control all information related to orders.

The scheduler 1202 manages the schedule of an order. A schedule determining unit 1202a determines the printing schedule. A schedule managing unit 1202b displays the printing schedule on the image display device 204. A print time calculating unit 1202c calculates the printing time based on the performance of the printer, the number of pages of the document, and the number of copies of the document to be produced. The method of calculating the printing time will be described below. A scheduler managing unit 1202d manages the schedule determining unit 1202a, the schedule managing unit 1202d, and the print time calculating unit 1202c and accesses the data managing unit 1203 to obtain schedule information and printer information. The data managing unit 1203 manages various data required for operating the order manager 1201 and the scheduler 1202. An order managing unit 1203a manages order information. A schedule managing unit 1203b controls the print schedule information. A progress managing unit 1203c manages the progress of the processing of each order. A printer information managing unit 1203d manages information related to the available real printers 111 to 116 in the print base 163 and information on a distributed virtual printer characterizes the present invention.

FIG. 13 illustrates exemplary printer information controlled by the printer information managing unit 1203d. The printer information is stored in the RAM 202 of the manager PC 106. According to this embodiment, the printer information is controlled as INI files. In other words, the software can referred to the printer information according to section information and key information at predetermined timings.

In this embodiment, real printers corresponding to actual printers and a virtual printer that is capable of managing a print job by distributing the print job among more than one printer are used. The real printer is mainly used for printing out a scheduled job. The virtual printer divides a print job and distributes the divided print jobs to the real printers being managed. The method of distributing a print job will be described below.

Printer information 1300 includes a section 1301 that is an area for storing the number of real printers and virtual printers. The number of real printers 1302a and the number of virtual printers 1302b are controlled as keys of the section 1301.

Sections 1303 to 1333 store information sets for each of the real printers indicated by the number included in the section 1301. The sections 1303 to 1333, for example, are constituted of keys, such as a key 1304 for controlling the printer name, a key 1306 for indicating the color classification of the printer, a key 1307 for indicating the printing speed of the printer, a key 1308 for controlling other information. Sections 1334 to 1336 are areas provided to control information on the virtual printers. The sections 1334 to 1336, for example, are constituted of keys such as a key 1335 for indicating the printer name and a key 1336 for indicating information on the real printer to be controlled.

According to this embodiment, whether a printer is a real printer or a virtual printer is determined on the basis of a section name or a printer key type included in the printer information. When a printer type is determined on the basis of the section name, the printer is determined to be a real printer if the character string "Real" is included in the section name, whereas the printer is determined to be a distributed virtual printer if the character string "Virtual" is included in the section name.

When the printer type is determined on the basis of the printer type key, the value set in "PrinterType" for each printer is referred to. More specifically, if the character string "Real" is set in "PrinterType," the printer is determined to be a real printer, whereas if the character string "Virtual" is set in "PrinterType," the printer is determined to be a distributed virtual printer. According to this embodiment, since the printer information 1300 is stored in the RAM 202 of the manager PC 106, the order manager 1201, the scheduler 1202, and the data managing unit 1203 of the manager PC 106 refer to the RAM 202 at predetermined timings in order to obtain and/or edit information included in the printer information 1300.

Figure 5:
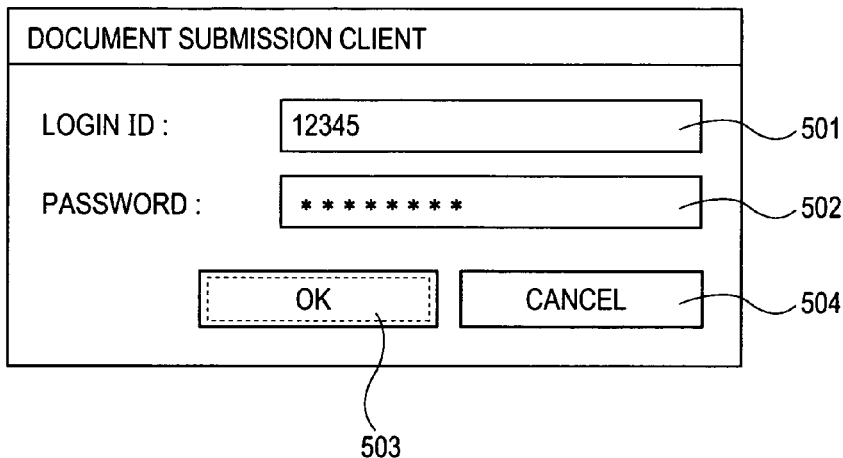
FIG. 5 illustrates a screen showing an exemplary log-in process a document submission client according to an embodiment of the present invention.
Figure 6:
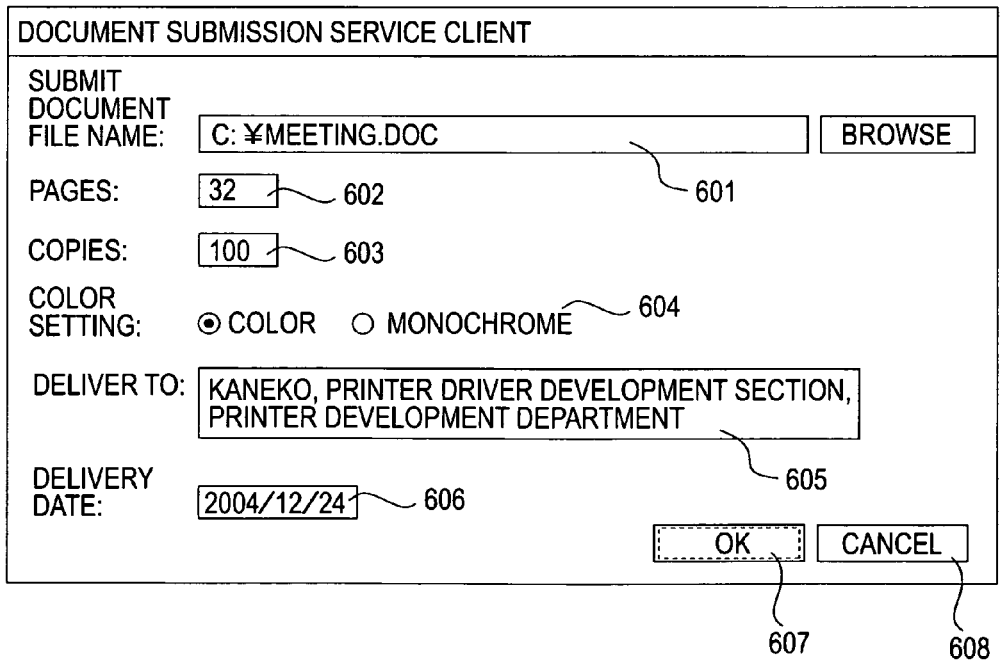
FIG. 6 illustrates an exemplary file submission screen according to an embodiment of the present invention.

FIGS. 5, 6, and 7 illustrate exemplary user interface (UI) screens of a document submission service client used in Step S401 of the document submission process, shown in FIG. 4. According to this embodiment, a job ticket includes the information specified and confirmed on the screen of the document submission service client displayed on the PC included in the client base 161.

In particular, FIG. 5 illustrates an example log-in screen used when logging into the document submission service provided by the print server 104. According to this embodiment, the user can access the document submission service by inputting the correct log-in ID 501 and password 502. The document submission client screen in FIG. 5 also includes an "OK" button 503 and a cancel button 504. As described above, details on account management are not described in detail here.

FIG. 6 illustrates an example UI used by the user to specify information related to the display order information displayed when log-in is authorized by the log-in process illustrated in FIG. 5. A field 601 is provided to specify the document to be submitted, a field 602 is provided to specify the number of pages of the submitted document file, a field 603 is provided to specify the number of copies to be printed out, a field 604 is provided to specify whether the document is to be printed out in color or monochrome, a field 605 is provided to specify the delivery destination, and a field 606 is provided to specify the delivery date. The document submission service client screen in FIG. 6 also includes an "OK" button 607 and a cancel button 608.

According to this embodiment, as shown in the field 602, the page number of the document is manually input by the user. However, the page number of the document may be automatically obtained by the document submission service client. Here, the page number in the field 602, the number of copies in the field 603, the color of the document in the field 604 are stored in the RAM 202 of the client PC 106 and are used when the print time calculating unit 1202c of the scheduler 1202 operating on the manager PC 106 calculates the printing time when required.

FIG. 7 illustrates an exemplary UI used to confirm order information input by the user, as shown in FIG. 6. However, this UI is not mandatory for this embodiment. A unique ID 703 is the same ID as the above-mentioned order ID and is automatically assigned by the print server when a document is submitted. When an order button 701 is pressed, an order is placed and the order information is uploaded to the print server 104. Since the order information, as described above, is stored in the RAM 202 of the client PC, the order information can be displayed as shown in FIG. 7 at a predetermined timing. Also, the aforementioned screen includes a cancel button 702.

Figure 14:
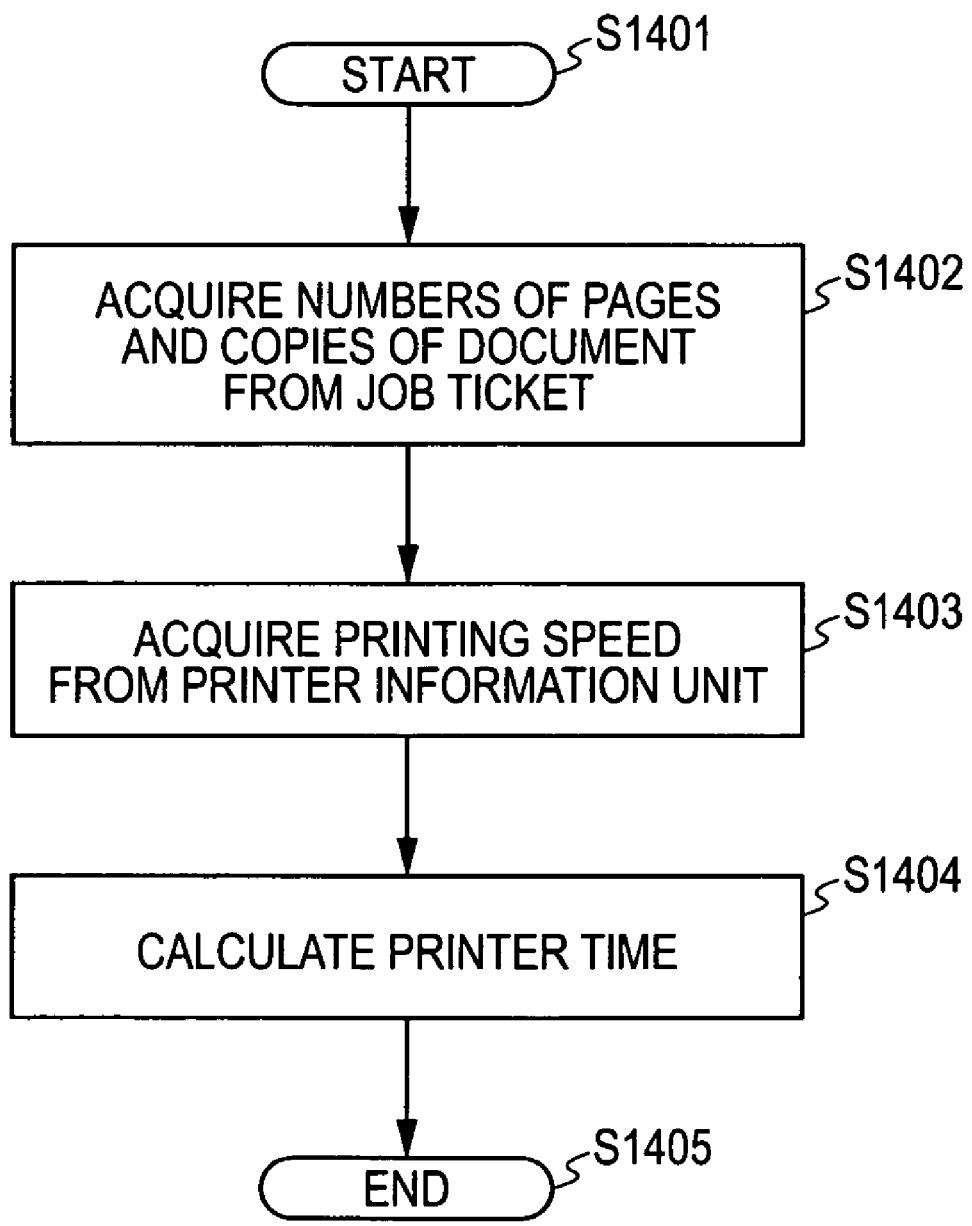
FIG. 14 illustrates a flow chart showing an exemplary print time calculation process carried out by a scheduler server according to an embodiment of the present invention.

FIG. 14 illustrates a flow chart showing an exemplary process for calculating the printing time carried out by the print time calculating unit 1202c of the scheduler 1202. The logic employed for calculating printing time is not important for this embodiment. However, for convenience, it is assumed that the printing time is calculated in accordance with the process shown in FIG. 14. The process for calculating printing time can be employed to the real printers 111 to 116. Steps shown in FIG. 14 may be carried out by the CPU 201 of the manager PC 106.

The process is initiated at Step S1401. Next, the print time calculating unit 1202c information on the number of pages of the document and the number of copies of the document to be produced from fields 804 and 805, respectively, included in a job ticket 800 (S1402). More specifically, since the fields 804 and 805 included in the job ticket 800 are provided in a format interpretable by the print time calculating unit 1202c, the process of Step S1402 can be carried out by the print time calculating unit 1202c.

Next, the print time calculating unit 1202c obtains the printing speed of a predetermined printer from the progress managing unit 1203c of the data managing unit 1203 (S1403). Then, by using the information on the number of pages of the document and the number of copies of the document to be produced obtained from the fields 804 and 805, respectively, in Step S1402 and the printing speed obtained in Step S1403, the print time calculating unit 1202c calculates the printing time based on the following formula (S1404):

[printing time]=[number of pages]×[number of copies]/[printing speed (minutes)]

For example, the print time required for printing 100 copies of a document having 32 pages at a printing speed of 32 ppm is:

[printing time]=32×100/32=100 minutes.

N-UP printing and two-side printing are not described in this embodiment. If such printing styles are used, printing time must be calculated by taking into consideration information on whether the document is printed on one side or two sides. However, the process of such calculation will not be described here. After the printing time is calculated in S1401, the process ends (S1405).

FIG. 8 shows an example job ticket. A field 801 represents the user ID specifying the user who submitted the document. A field 802 represents a unique order ID assigned by the print server 104. A field 803 represents a file name of the submitted document. The job ticket also includes order information such as the field 804 representing the number of pages, the field 805 representing the number of copies of the document to be produced, a field 806 representing color or monochrome printing, a field 807 representing the destination information, and a field 808 representing the delivery date. Such a job ticket including such order information is generated each time an order is submitted. The order manager 1201 and the scheduler 1202 are capable of referring the information included in the job tickets at predetermined timings.

According to this embodiment, a job ticket manages information in text format by keys (e.g., "order ID" shown in the field 802 provided to specify a unique order ID) and set values (e.g., "ABCD0001" set in the field 802 provided to specify the order ID) for the set items. However, instead, other formats, such as extended markup language (XML) or job definition format (JDF), may be used.

Figure 9:
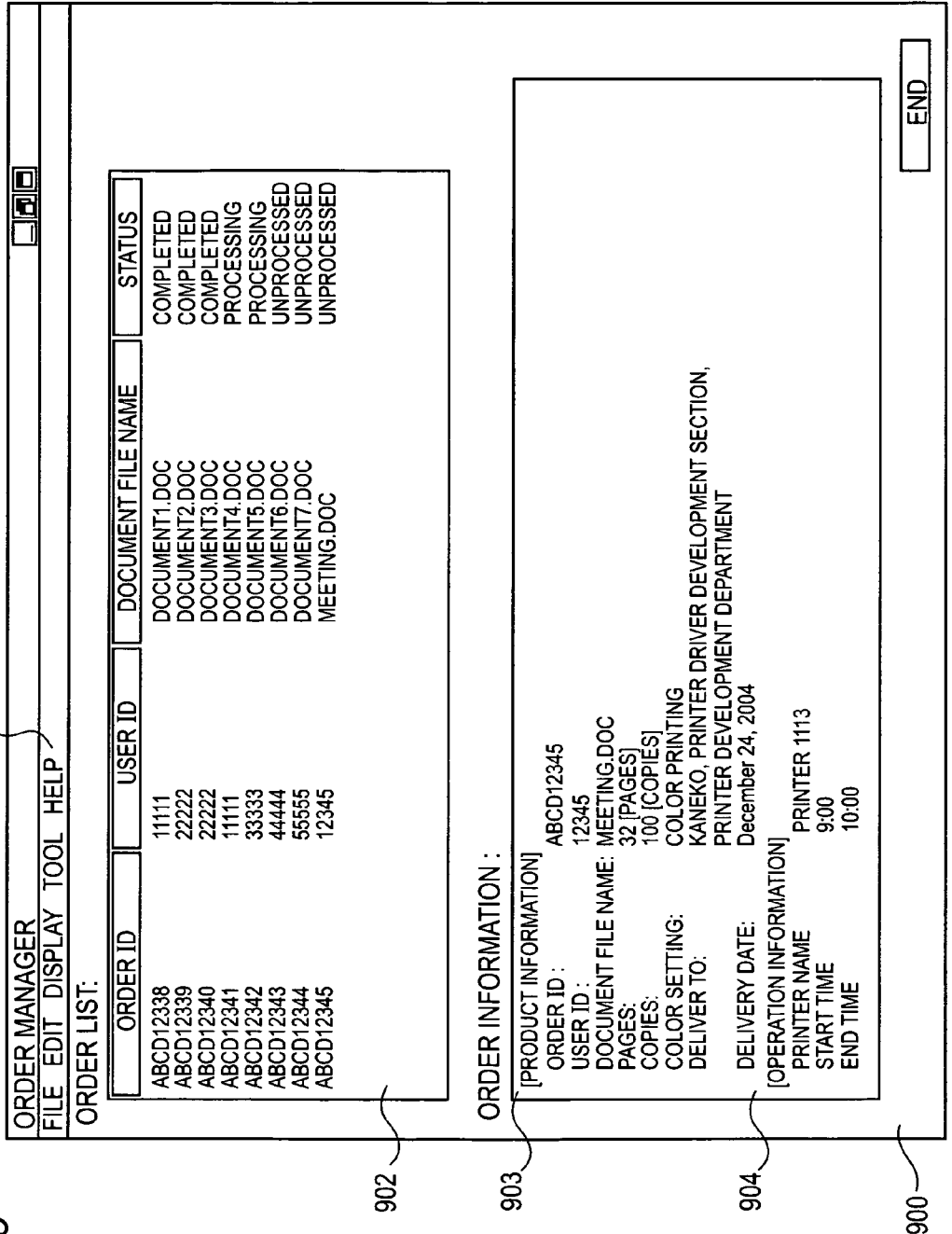
FIG. 9 illustrates an exemplary order manager screen according to an embodiment of the present invention.

FIG. 9 illustrates an example UI screen of the order manager 1201 operating on the manager PC 106. When new order information is received in Step S406, as shown in FIG. 4, the order manage 1201 displays a UI 900 for order management, such as that shown in FIG. 9. A menu 901 is a typical menu used for software and is operated to store information, display a help, and confirm the version of the software. Order information list 902 includes order IDs, user IDs, document file names, and the status of the order that has been submitted and may be tracked. As shown in FIG. 9, the status of the files being processes are indicated by the terms "completed" indicating that the operation is completed, "processing" indicating that the operation is being processed, and "unprocessed" indicating that the operation schedule is undetermined. The method for scheduling such an "unprocessed" order characterizes the present invention. The scheduling method will be described below.

Still referring to FIG. 9, an item 903 is an UI displaying detailed information of the order when "meeting.doc" is selected in an order information list 902. The item 903 includes information written in the job ticket shown in FIG. 8. An item 904 is an UI for displaying the content of the assigned operation. For the UI shown in FIG. 9, since a schedule for the selected order is not set yet, detailed information is not displayed.

Figure 18:
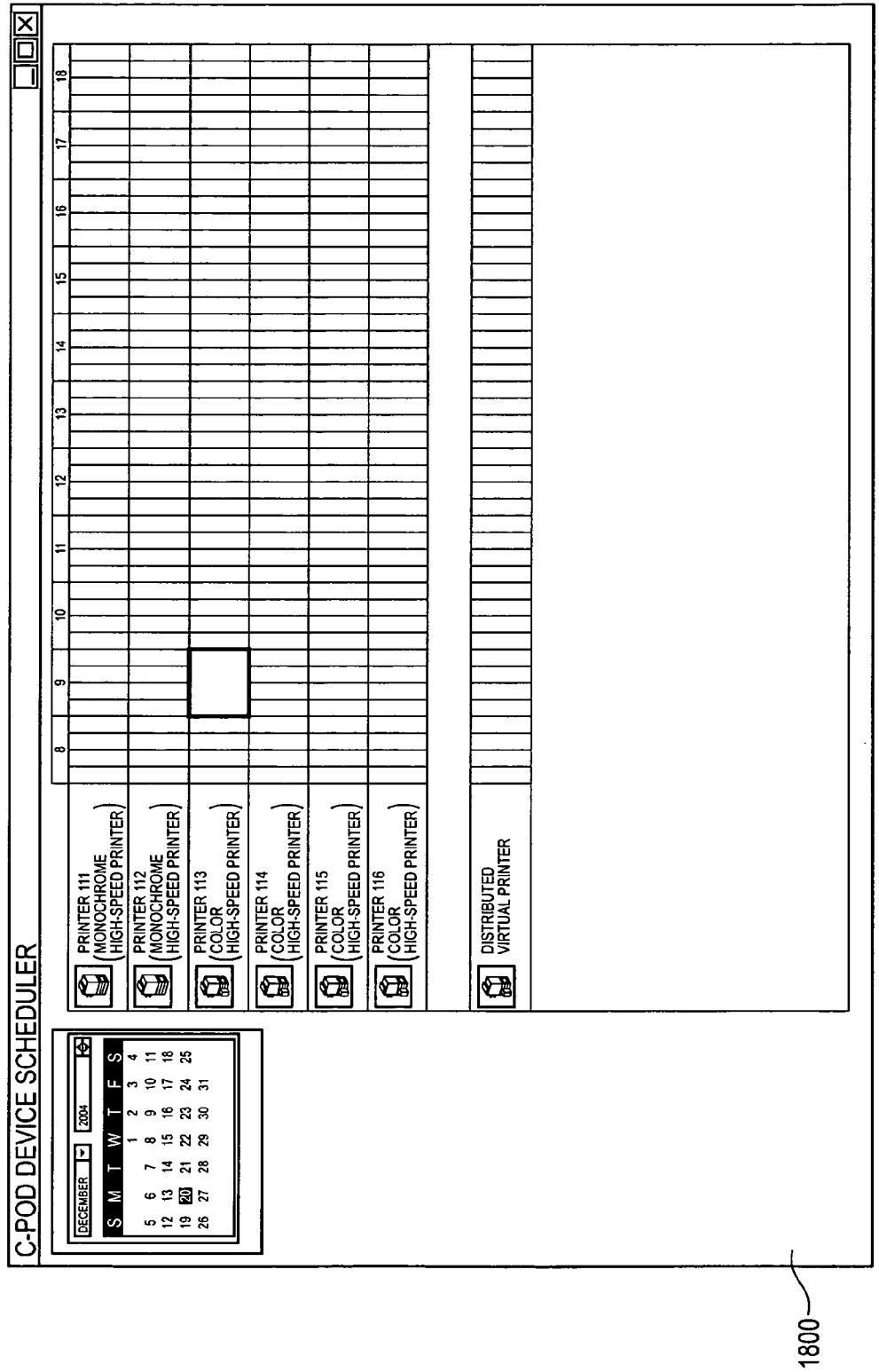
FIG. 18 illustrates an exemplary scheduler UI corresponding to a work schedule produced by the schedule server according to an embodiment of the present invention.

FIG. 10 illustrates an example UI screen 1000 of the order manager 1201 operating on the manager PC 106 when a job is assigned to a real printer. According to this embodiment, some of the displayed operation information 1001 includes the printer to be used, the start time of the operation, and the end time of the operation. An example UI screen 1800 of the scheduler 1202 corresponding to this schedule is shown in FIG. 18.

Figure 19:
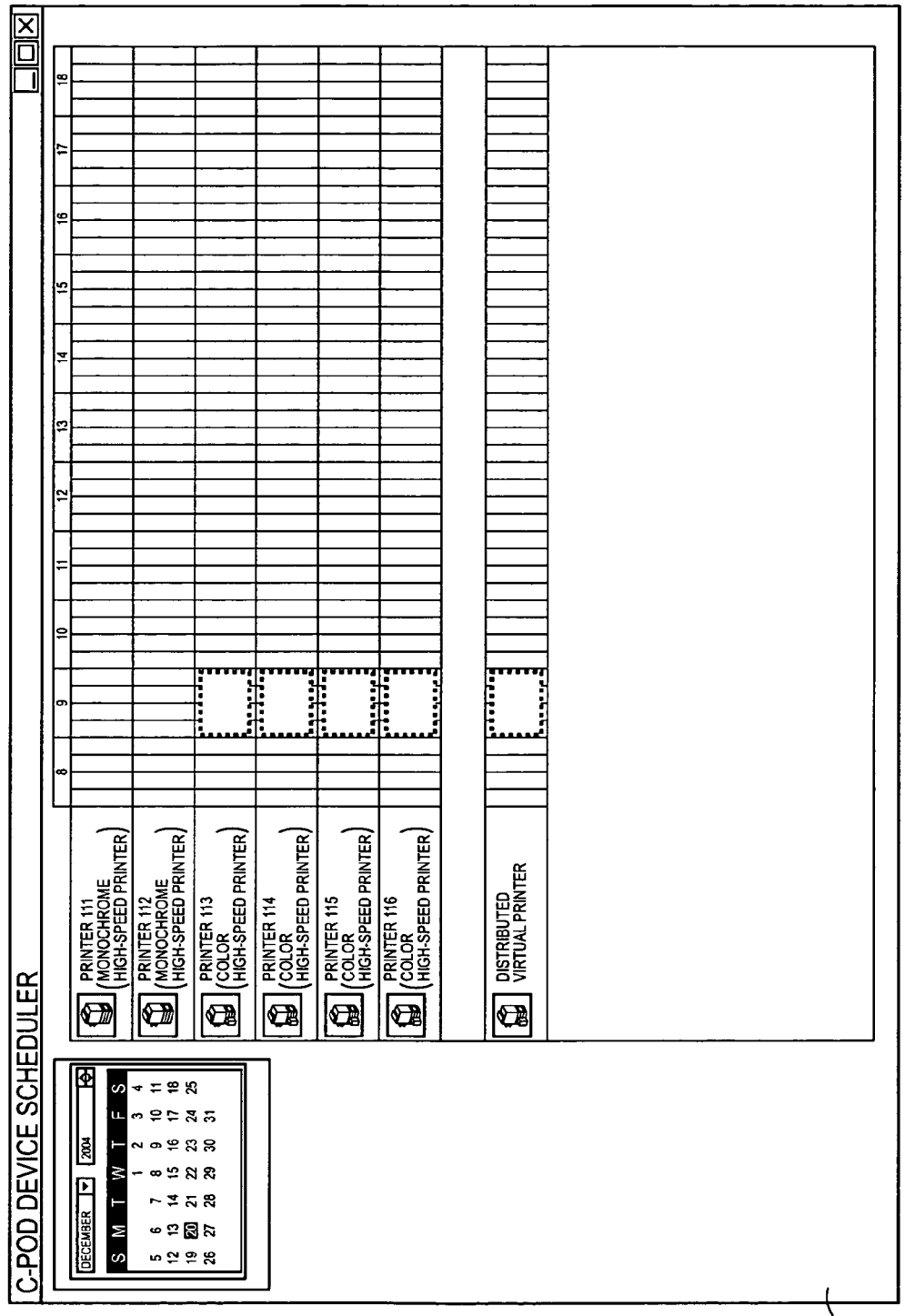
FIG. 19 illustrates another exemplary scheduler UI corresponding to a work schedule produced by the schedule server according to an embodiment of the present invention.

FIG. 11 illustrates an example UI screen 1100 of the order manager 1201 operating on the manager PC 106 when a job is assigned to a distributed virtual printer. According to this embodiment, some of the displayed operation information 1101 includes the printer to be used, the start time of the operation, and the end time of the operation. An example UI screen 1900 of the scheduler 1202 corresponding to this schedule is shown in FIG. 19.

Figure 15:
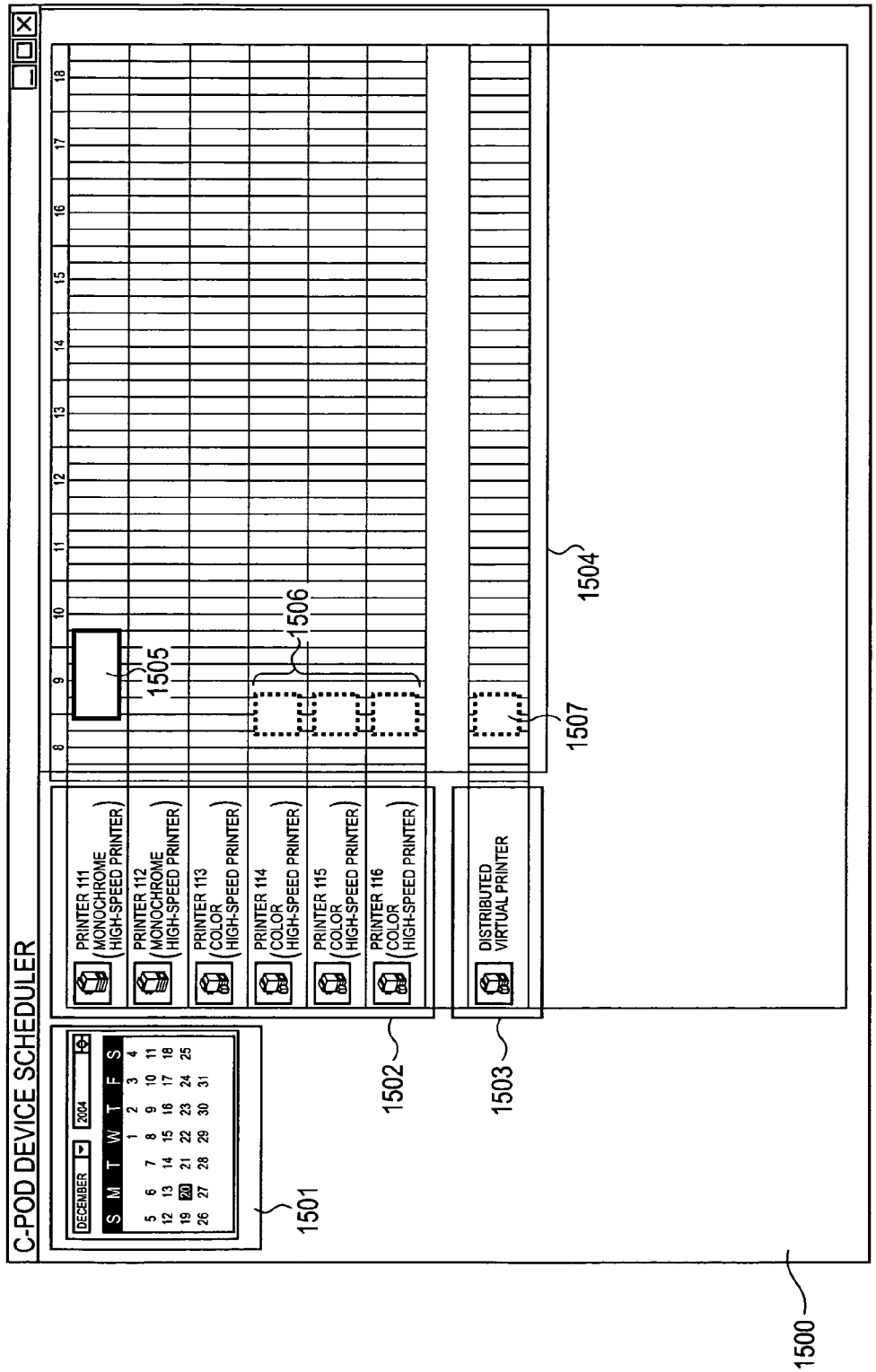
FIG. 15 illustrates an exemplary scheduler user interface (UI) corresponding to a work schedule produced by the schedule server according to an embodiment of the present invention.

FIG. 15 illustrates an example UI screen of the scheduler 1202 operating on the manager PC 106. According to this embodiment, a schedule UI 1500 is displayed on the image display device 204 by the schedule managing unit 1202b of the scheduler 1202. An area 1501 displays the date corresponding to the displayed schedule. The content of the schedule corresponding to the date specified by the area 1501 is displayed by the scheduler managing unit 1202d. An area 1502 displays entry information of the available real printers 111 to 116 in the print base 163. An area 1503 displays entry information on a distributed virtual printer. An area 1504 displays the reservation states of the real printers and the virtual printer. Rectangles 1505 to 1507 indicate the actual reservation states. According to this embodiment the rectangle representing, the reservation state of a job assigned to a real printer (rectangle 1505) is drawn in solid lines, and the rectangle representing reservation state of a job assigned to a virtual printer (rectangles 1506 and 1507) is drawn in dotted lines.

According to this embodiment, a predetermined order listed in the order information list 902 displayed in the UI 900 of the order manager 1201 is dragged and dropped onto the areas 1502 and 1503 representing the printers included in the schedule UI 1500 to reserve a predetermined printer for use. According to the embodiment of the present invention, when an order is dropped on to a distributed virtual printer, reservations are made for the real printers assigned to functions as a distributed virtual printer.

In the scheduler UI 1500, when an order is dropped onto the area 1503 representing the distributed virtual printer, the rectangles 1506 and 1507 representing the reservation states are displayed to indicate that the distributed virtual printer has been reserved and that the corresponding real printers (printers 114, 115, and 116) has been reserved to distribute the order.

The reservation process carried out when an order is dragged from the order manager 1201 and dropped onto the scheduler 1202 will be described in detail below.

Figure 16:
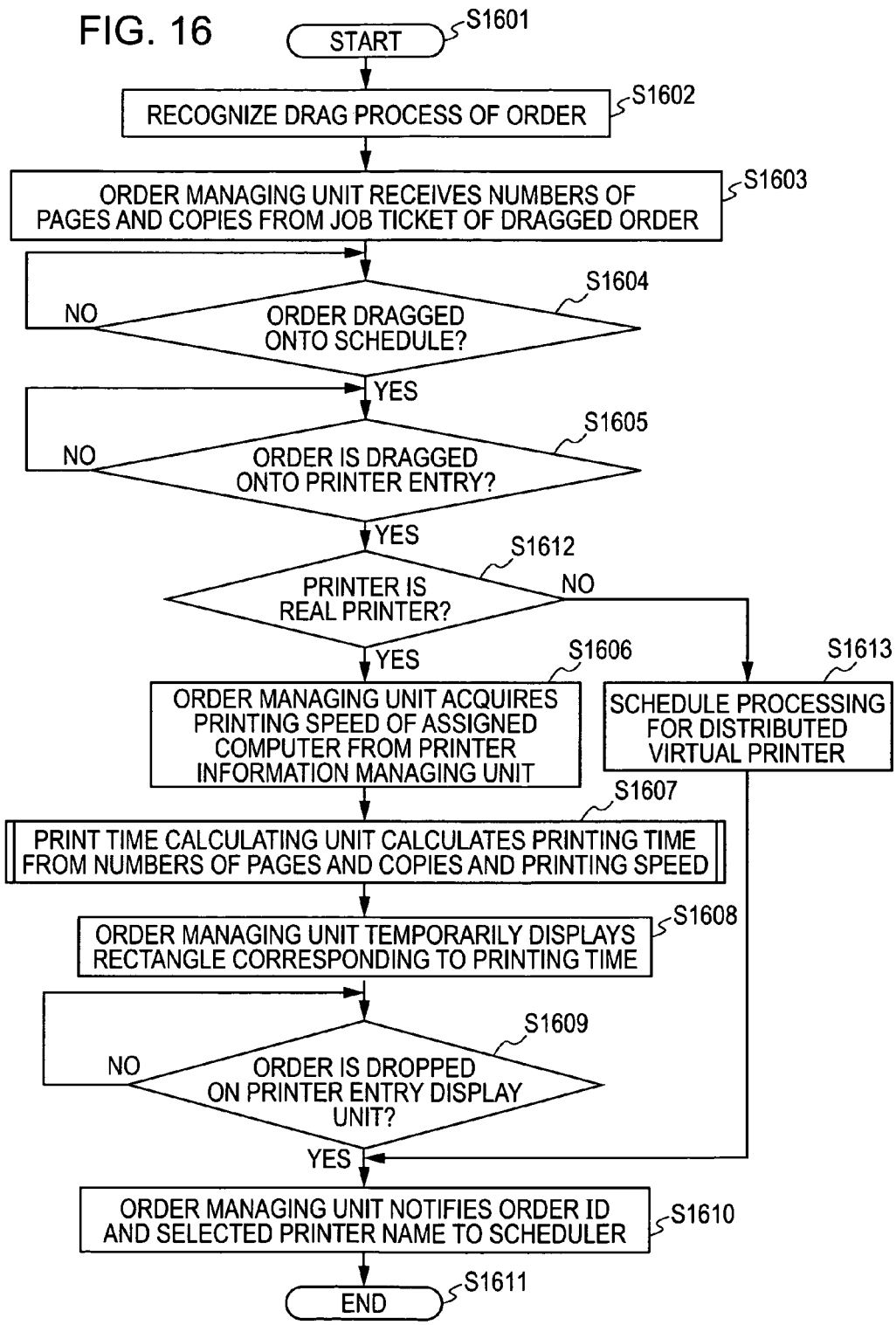
FIG. 16 illustrates a flow chart showing an exemplary overview of a basic process according to an embodiment of the present invention carried out when a predetermined order is selected, dragged, and dropped on a displayed printer name.

FIG. 16 illustrates a flow chart showing an overview of an exemplary basic process carried out at the order manager 1201 operated on the manager PC 106 according to this embodiment of the present invention when the user selects and drags a predetermined order from the order information list 902 and drops the order onto a printer displayed in the scheduler 1202. The process shown in FIG. 16 is carried out by the CPU 201 of the manager PC 106.

At S1601 the process is initiated. When the order manager 1201 recognizes that a predetermined order is being dragged (S1602), the order managing unit 1201*c* of the order manager 1201 obtains information on the number of pages and the number of copies to be produced of the order being dragged from the data managing unit 1203 (S1603). More specifically, the order manager 1201 obtains the information on the number of pages and the number of copies to be produced for the order being dragged at a predetermined timing from the RAM 202 of the manager PC 106 where information on all orders is stored.

When an order is dragged onto the schedule UI 1500 by operating a mouse (S1604), the order manager 1201 determines whether the order has been moved onto a printer entry display area (such as the area 1502) on the schedule UI 1500 (S1605). If the order is dragged onto a printer, the order manager 1201 determines whether this printer is a real printer or a distributed virtual printer (S1612). When the order is dropped on a real printer, the printing speed of the real printer is obtained from the data managing unit (S1606). More specifically, the data managing unit 1201*c* manages information on the printing capability (including the printing time) of the real printers stored on the RAM 202 of the manager PC 106, by considering the information on the number of pages and the number of copies obtained in Step S1603, the order manager 1201 can obtain information on the printing speed at a predetermined timing.

Whether the order is dragged onto a real printer functioning as a virtual printer may be determined in Step S1612 by obtaining the coordinates of the location where the order has been dropped onto by operating the mouse. According to this embodiment, there are two methods of assigning an order to a printer. In one method, an order can be directly assigned to a real printer by setting a reservation time using the setting UI shown in FIG. 25 and dragging the order onto the real printer. In another method, as described below, an order can be assigned to a distributed virtual printer without specifying the reservation time and the real printers that are to be actually used.

At this time, the print time calculating unit 1202*c* calculates the required print time in accordance with the above-described calculation method based on the number of pages and the number of copies of the document and the printing speed of the printer to be used. The required printing time calculated in Step S1607 is stored in the RAM 202 of the manager PC 106.

Figures 23, 24, 25:
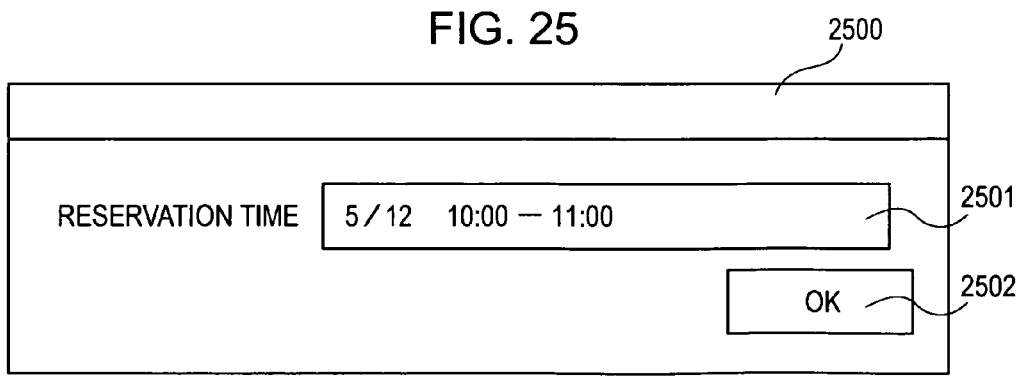
FIG. 23 illustrates exemplary storage information on schedule information according to an embodiment of the present invention.
FIG. 24 illustrates exemplary updated storage information on schedule information according to an embodiment of the present invention.
FIG. 25 illustrates an exemplary reserved time setting UI according to an embodiment of the present invention.

When the required printing time is determined in Step S1607, the order managing unit 1201*c* temporarily displays a rectangle drawn in solid lines corresponding to the required printing time on the schedule UI 1500 (S1608). At this state, if it is determined that the order has been dropped onto an area (i.e., printing entry display unit) corresponding to a real printer by operating the mouse or the like (S1609), the order managing unit 1201*c* notifies the order ID of the dropped order on the scheduler and the name of the selected printer to the scheduler (S1610). Then, the process is ended (S1611). When the order is dropped onto a real printer, the setting UI shown in FIG. 25 is displayed so that the real printer can be reserved for processing using the setting UI shown in FIG. 25, as described below.

If it is determined that a distributed virtual printer is selected in Step S1612, the order manager 1201 carries out a scheduling process for the distributed virtual printer (S1613). Details of the scheduling process for a distributed virtual printer will be described later with reference to FIG. 17.

The order manager 1201 determines whether the dragged order has been dropped onto a distributed virtual printer in the printer entry area in Step S1604 (S1609). If it is determined that the order has been dropped on a distributed virtual printer displayed in the schedule UI 1500, the process goes to the above-described Step S1610. An order that has been dropped onto a real printer in the printer entry display area of the schedule UI 1500 in Step S1612 is set to high-priority level and is stored in the RAM 202. The order dropped onto the virtual printer is set to a low-priory level and is stored in the RAM 202. As described below, an order assigned to a real printer is given high priority over an order assigned to a virtual printer and is scheduled preferentially over an order assigned to a virtual printer. In other words, the order assigned to a real printer is processed with priority at a predetermined time and with a predetermined printer. Details are described below.

If an order is dropped on an area outside the controlled area by operating the mouse or the like in Steps S1603, S1604, S1605, S1606, S1607, S1608, S1609, and S1612, the drag and drop process according to this embodiment is cancelled. FIG. 16 illustrates an example of a drag and drop process. However, since the internal processing for this process differs for each operation system (OS), the drag and drop process according to this embodiment is not limited to any particular architecture.

Figure 17:
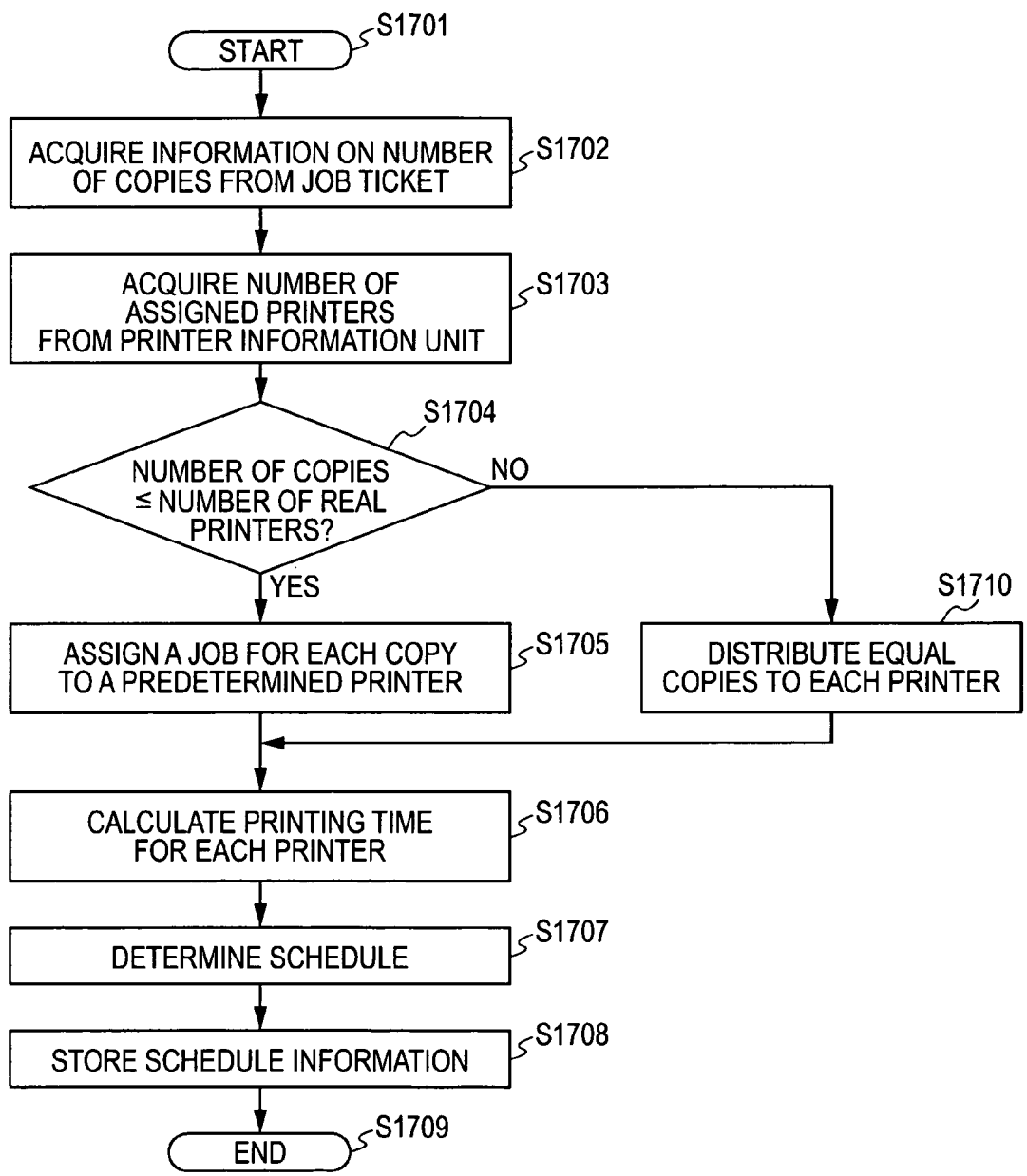
FIG. 17 illustrates a flow chart showing an exemplary distributed process carried out when a job is assigned to a distributed virtual printer in a scheduler according to an embodiment of the present invention.

FIG. 17 is a flow chart showing an exemplary distributed process for distributing a job to a distributed virtual printer using the scheduler 1202. This flow chart illustrates an exemplary detailed process carried out in Step S1613 in FIG. 16. When distributing the order, it is desirable to employ a distribution method that considers the printing speed of the real printers to which the job is distributed so that the processing time of each real printer becomes equal. However, according to this embodiment, the actual distribution process is not limited, and thus, other variations of a distribution process may also be utilized. According to this embodiment, a distribution method in which only the number of printers to be used to process the distributed jobs is considered. The process illustrated in FIG. 17 is carried out by the CPU 201 of the manager PC 106.

In FIG. 17, the process is initiated (S1701) and then the scheduler managing unit 1202*d* obtains information on the number of copies to be produced from the job ticket (S1702). Then, the scheduler managing unit 1202*d* obtains information on the assigned distributed virtual printer to which the order is assigned from the data managing unit 1203 and determines the number of real printers to which the job is distributed (S1703). More specifically, since the information included in the job ticket generated by the print server 104 is interpretable by the scheduler managing unit 1202*d*, Step 1702 can be carried out. As shown in FIG. 13, the printer information includes information on the real printers that function as a distributed virtual printer (key 1336 in FIG. 13). In Step S1703, the scheduler managing unit 1202*d* refers to the printer information stored in the RAM 202 of the manager PC 106 to determine which real printers can be used to carry out processing in accordance with the order information (for example, color printing) included in the job ticket.

The scheduler 1202 compares the number of copies of the document to be produced with the number of real printers available for processing the order while functioning as a distributed virtual printer. If the scheduler 1202 determines that the number of copies is smaller than the number of real printers (S1704), a job corresponding to each copy is assigned to each real printer determined in Step S1703 as available for functioning as being assigned as a distributed virtual printer (S1705). The RAM 202 of the manager PC 106 stores information on which job is assigned to which real printer.

After jobs are assigned in Step S1705, the print time calculating unit 1202c calculates the printing time required by each real printer (S1706) and carries out a scheduling process for each real printer (S1707). More specifically, a schedule is prepared for the real printers based on the required printing time calculated in Step S1706, the availability of the printers to which jobs have been assigned, and the order information included in the job ticket.

By referring to the information on the delivery date included in the order information, a schedule is prepared (i.e., schedule information is generated) so that the delivery date is met. Since the printer information for each real printer is stored in the RAM 202 of the manager PC 106, scheduling is carried out by considering the printing ability of the real printers and schedule information described below so that processing of the jobs assigned to the real printers functioning as a distributed virtual printer is completed at substantially the same timing.

For example, when the printing speeds of a printer 1113 and a printer 1114 are compared, it is determined that the printing speeds are the same according to the information shown in FIG. 13. Therefore, these printers are scheduled to produce the same number of copies. Now, a method of scheduling considers the schedule information will be described. For example, a reservation to carry out processing from 9:00 to 11:00 is made using the setting UI shown in FIG. 25. If the printer 1113 can be used for processing for one hour between 10:00 to 11:00 and the printer 1114 can be used for processing for two hours between 9:00 to 11:00, job for producing copies of the document at a one to two ratio will be schedule for the printers 1113 and 1114, respectively (i.e., (printer 1113): (printer 1114)=1:2). In this way, both printers will complete the production of the copies at substantially the same time. Since the schedule information of each printer includes information on the processing time, as shown in FIGS. 23 and 24, the printers are determined as being available except for the time period indicated by the processing time.

The scheduler 1202 stores the schedule information on the schedule set in Step S1707 on the RAM 202 of the manager PC 106 via the progress managing unit 1203c (S1708). Then, the process is completed (S1709).

In Step S1704, if it is determined that the number of copies to be produced is greater than the number of real printers to which the jobs are assigned, the scheduler 1202 calculates how to distribute the production of copies so that the number of copies produced by each real printer (S1710). Then, the process goes to Step S1706. According to this embodiment, the calculation for determining the number of copies to be produced by each real printer carried out in Step S1710 is based on the following formula:

[number of copies produced by each real printer]=
    [number of copies indicated in job ticket]/[number of real printers to which jobs are assigned]

The remainder obtained from the above formula is carried over and, if necessary, a new job is assigned to a predetermined real printer selected by the schedule managing unit. At this time, this additional job will be preferentially assigned to a real printer having a high processing speed. It is also possible to distribute the jobs to printers in accordance with the performance of the printers so that the processing carried out by the printers is completed at substantially the same timing. In this way, schedule management becomes easy. The number of copies to be printed by each printer can be determined on the basis of methods well known to one skilled in the art, such as a method in which the number of copies to be printed is determined proportionally to an inverse number of the printing speed of the printer obtained in advance.

As shown in FIGS. 16 and 17, to schedule a new order, order information on the new order displayed on the order manager 1201 is selected, dragged, and dropped onto a predetermined printer so as to determined printer to be used for processing the order. As show in FIG. 17, when the order is assigned to a virtual printer, the order is assigned so that the delivery date specified in the order information is met. In other words, for an order assigned to a virtual printer, the printers to be used for processing the order and the processing time of the order are determined according to information (order attribute) included in the order information.

Figure 20:
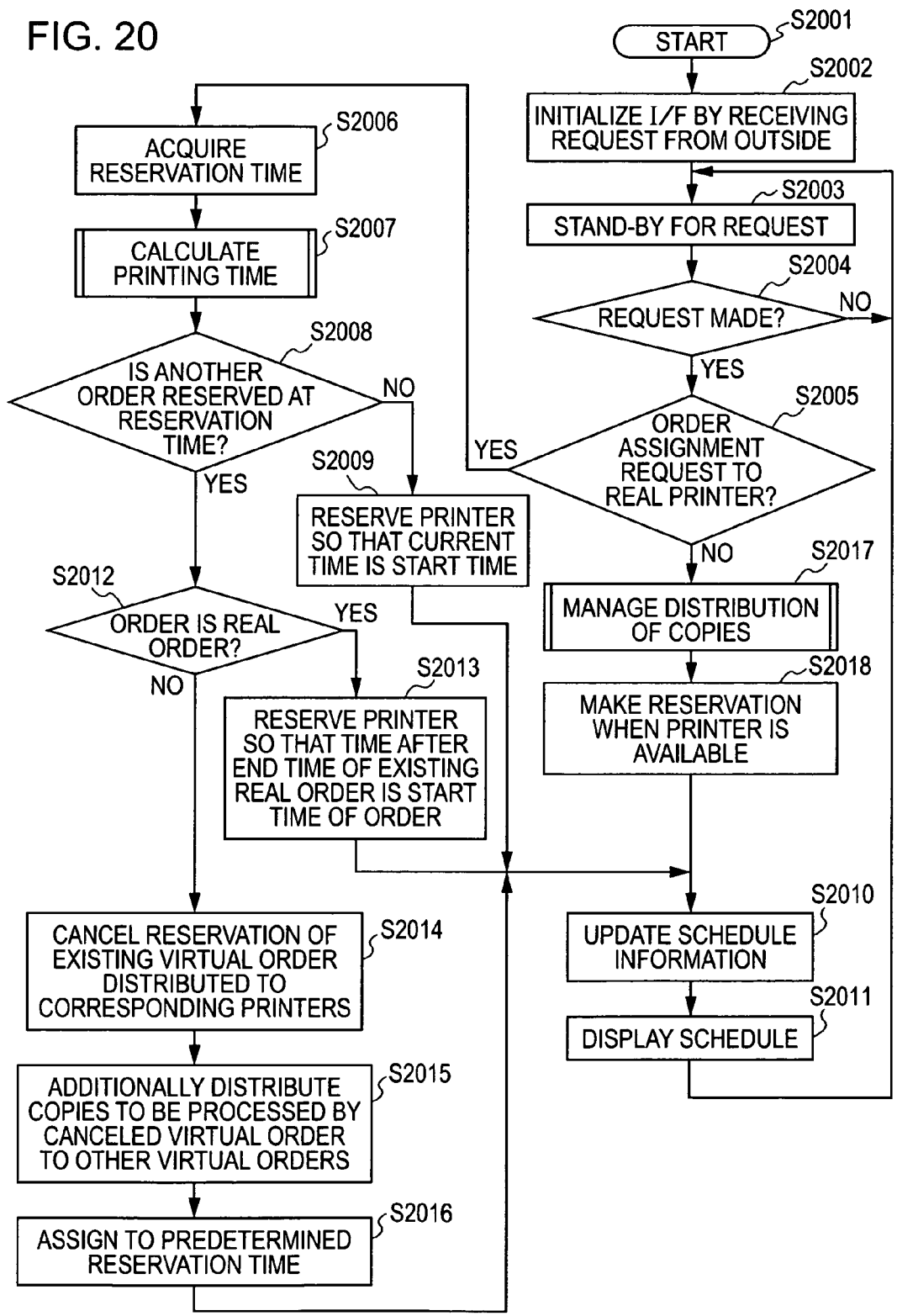
FIG. 20 illustrates a flow chart showing an exemplary scheduler process carried out on a manager PC according to an embodiment of the present invention.

FIG. 20 illustrates a flow chart showing an exemplary process carried out by the scheduler 1202 operating on the manager PC 106 according to an embodiment of the present invention. As described above, when an order is assigned to a distributed virtual printer, the jobs for producing a predetermined number of copies are distributed equally among at least two real printers that are linked in advance to the selected distributed virtual printer, to print out the predetermined number of the copies of the document. By dropping an order onto a distributed virtual printer on the schedule UI, the priority level of the order assigned to the real printers without specifying the processing time and the real printers to be used is set to a "low-priority" level (hereinafter, an order assigned for a distributed virtual printer is referred to as a "virtual order"). In contrast, by dropping the order onto a real printer on the schedule UI, the priority level of the order assigned to the real printers of a predetermined processing time is set to a "high-priority" level (hereinafter, an order assigned for a real printer is referred to as a "real order").

When a virtual order and a real order are compared, the priority level of the real order is higher than the priority level of the virtual order. According to this embodiment, since the processing of a real order is give priority over the processing of a virtual order, when a real order is to be assigned to a printer at a time that has already been reserved for a virtual order, the real order is assigned in a manner such that the reservation for the virtual order is interrupted. In other words, schedule information is generated so that the real order is processed at the specified time with the specified printer. In contrast, when a virtual order is to be assigned to a printer at a time that has been reserved for a real order, the virtual order cannot interrupt the reservation for the real order. Therefore, when a virtual order may interrupt a real order, the scheduler 1202 reschedules the virtual order. The steps included in the flow chart shown in FIG. 20 are carried out by the CPU 201 of the manager PC 106.

Next, the steps in the flow chart in FIG. 20 will be described in detail. The process begins at Step S2001. The scheduler 1202 initializes the interface used to receive a message from an external module (for example, the order manager 1201) (S2002). Then, the scheduler 1202 maintains a request standby state (S2003) by repeating Steps S2003 and S2004 until a request is received (S2004). A request is made by dragging and dropping an order onto a predetermined printer on the schedule UI so that the order information is processed by the predetermined printer. When a printer is assigned to process the order information by the drag and drop operation, the order information and the information of the assigned printer are linked and stored in the RAM 202 of the manager PC 106.

The scheduler 1202 determines whether the request made in Step S2004 is a request for assigning an order to a real printer (S2005). More specifically, since the request information generated in Step S2004 is stored in the RAM 202, the scheduler 1202 recognizes which printer has been assigned by referring to the RAM 202. Accordingly, Step S2005 can be carried out. An order is assigned to a real printer, as described above, when a request is made by dropping the order onto a real printer displayed on the printer entry. In response to dropping the selected order on the real printer, a setting UI, as shown in FIG. 25, is displayed.

Now, the setting UI 2500, shown in FIG. 25, will be described. The setting UI 2500 has a box 2501 used for setting the reservation time. By pressing an OK button 2502 after inputting a predetermined reservation time in the box 2501, the reservation time of the selected order is set. The set reservation time, as shown in FIG. 25, is stored in the RAM 202 of the manager PC 106.

In Step S2005, if it is determined that an order has been assigned to a real printer, the scheduler 1202 obtains the reservation time specified or the order using the setting UI 2500, shown in FIG. 25 (S2006). More specifically, since the reservation time is stored in the RAM 202, the scheduler 1202 can refer to the RAM 202 to carry out the processing in Step S2006.

The scheduler 1202 calculates the printing time (S2007), as describe above, and prepares the information required for assigning an order. Then, the scheduler 1202 determines whether another order is assigned for the reservation time obtained in Step S2006 (S2008). More specifically, since the schedule information for each printer, as shown in FIGS. 23 and 24, is stored in the RAM 202 of the manager PC 106, the determination process in Step S2008 can be carried out by comparing this information with the reservation time obtained in Step S2006. In this process, whether or not a scheduled order is already assigned to the specified real printer at the specified reservation time can be determined.

In Step S2008, if it is determined that another order is not assigned to the reservation time obtained in Step S2006, the printer is assigned to the reservation time set using the setting UI 2500 and the print time calculated in Step S2007 (S2009). Then, the schedule information is updated (S2010), the schedule is displayed on the image display device 204 (S2011), and the request stand-by state is entered again (S2003).

In Step S2008, if the scheduler 1202 determines that another order is assigned to the reservation time obtained in Step S2006, the priority level of the new order and the priority level of the existing order are compared (S2012). More specifically, for the order information, the reservation time is set with the setting UI 2500, shown in FIG. 25, and the priority level is set by dropping the order onto the printer in the setting UI 2500. Then, this order information is temporarily stored in the RAM 202. Here, the priority level of the temporarily stored new order and the priority level of the existing order already stored in the RAM 202 are referred to in order to carry out the processing for Step S2012. In other words, in Step S2012, the reservation time for the existing order is set with the setting UI 2500, and then, according to the order attribute, the order is determined whether it has been directly assigned to a real printer.

According to the comparison carried in Step S2012, if the priority level of the existing order is "high-priority" (i.e., if it is a 'real order'), the new order is assigned to the printer so that the start time of the new order is set after the end time of the existing order (S2013). Then, the processing for Step S2010 is carried out. Since the scheduled order information per printer is stored in the RAM 202 of the manager PC 106 while being linked to order information, processing time, and priority level (i.e., high priority level for a real printer and low priority level for a virtual printer), the processing for Steps S2012 and S2013 can be carried out. According to Step S2013, a new real order is assigned after the processing of an existing real order is completed. However, this process is not limited, and the delivery dates of the existing real order and the delivery date of the new real order may be compared so that the order assigned to an earlier delivery date is given priority.

In Step S2012, if the scheduler 1202 determines that the existing order is a virtual order (i.e., NO), the reservation of the existing virtual order is canceled (S2014). Then, the copies of the document that were to be produced by processing the virtual order are additionally distributed to another virtual order (S2015). More specifically, as shown in FIG. 13, the printer information includes real printer information included in the distributed virtual printer information. Therefore, when a reservation of an existing virtual order is cancelled in Step S2014, the real printer included in the real printer information in the included in the distributed virtual printer information, except for the cancelled real printer, can be recognized.

In Step 2015, the cancelled virtual order is distributed to real printers included in the real printer information in the included in the distributed virtual printer information, except for the cancelled real printer, can be recognized. In other words, the scheduler 1202 generates schedule information for the existing order, which has been scheduled without being assigned to a reservation time and a real printer, so that the time and the printer to which the existing order was assigned are changed. The cancelled existing virtual order may be rescheduled by generating a schedule so that the existing virtual order is processed after the new real order at the same printer.

The scheduler 1202 reserves a printer by replacing the virtual order cancelled in Step S2014 with the new real order determined in Step S2005 (S2016). More specifically, the virtual order stored in the RAM 202 is replaced with the new real order information reserved in S2016. In other words, in Step S2016, a schedule is generated by making a reservation so that the order assigned to a reservation time and a real printer is processed at the specified time and printer.

In Step S2005, if the scheduler 1202 determines that a virtual order is scheduled, the above-mentioned distribution of the copies of the document is carried out (S2017), the printers to which the copies are distributed are reserved (S2018), and Step S2010 is carried out.

As described above, a real order can be reserved with priority over an already-reserved virtual order for a predetermined time using the setting UI, shown in FIG. 25. In Step 2014, the reservation of a virtual order replaced by a reservation of a real order is cancelled. However, when the virtual order cannot be distributed to other printers, the reservation is not canceled, and the processing is carried out after the processing of the real order replacing the virtual order is completed.

When the number of printers to which the virtual order is distributed is reduced in Step S2015, the amount of processing required by the remaining distributed printers is increased. At this time, the end time of the virtual order is delayed. If, after the virtual order, another virtual order is reserved, the start time of this other virtual order is also delayed. In this way, dynamic schedule information can be displayed.

According to this embodiment, a real order is scheduled to be processed at a time reserved by using the setting UI, shown in FIG. 25. However, if the delivery date of the real order to be scheduled is not coming up immediately and if the delivery date of the virtual order that has already been scheduled for the reservation time meets predetermined conditions (for example, the delivery date being the current day), a message may be displayed so that the user may select the virtual order to be processed before the real order. Instead, it is also possible to change the schedule by setting a higher priority to the virtual order than the real order.

Figure 21:
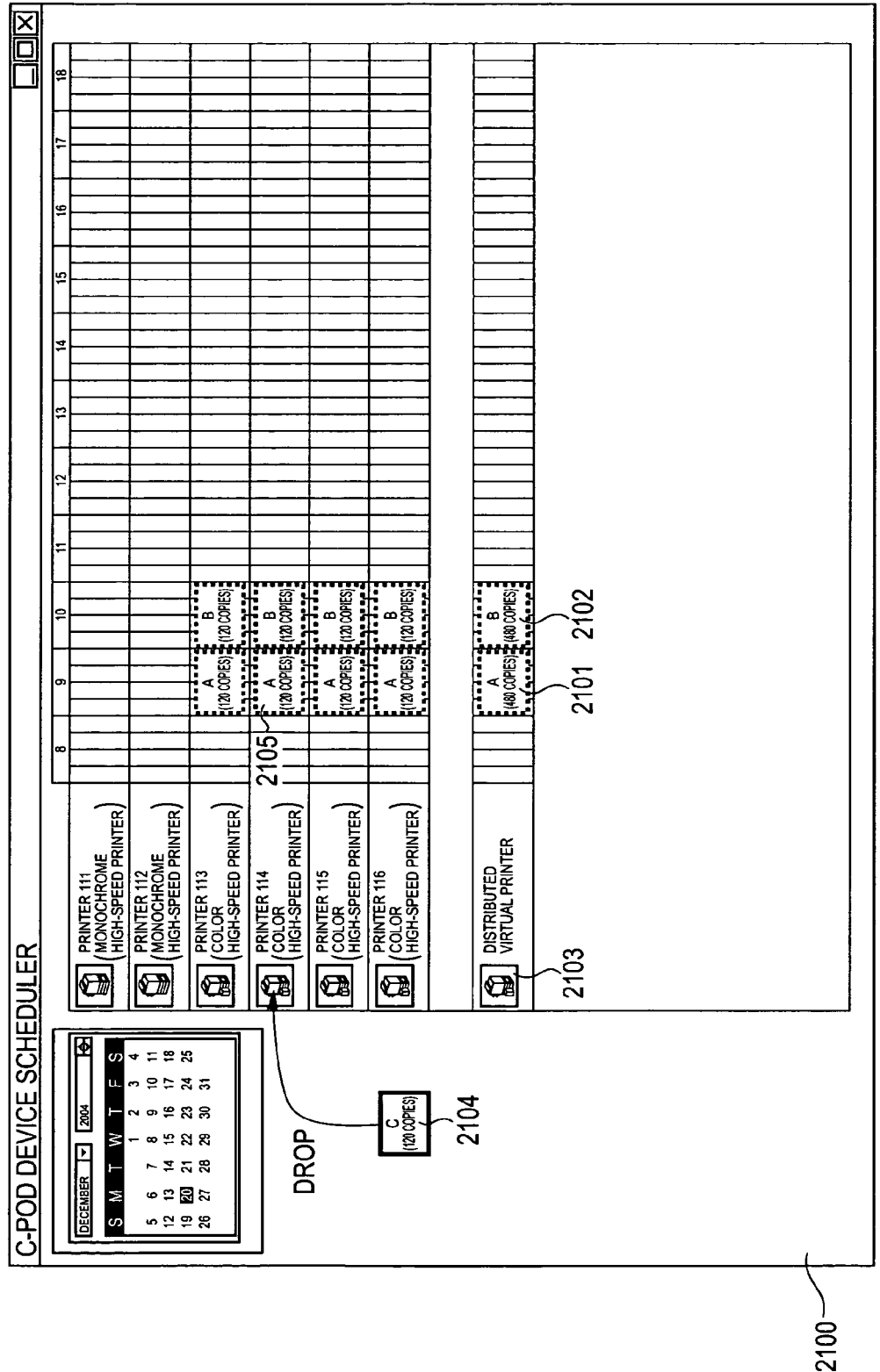
FIG. 21 illustrates yet another exemplary scheduler UI corresponding to a work schedule produced by the schedule server according to an embodiment of the present invention.
Figure 22:
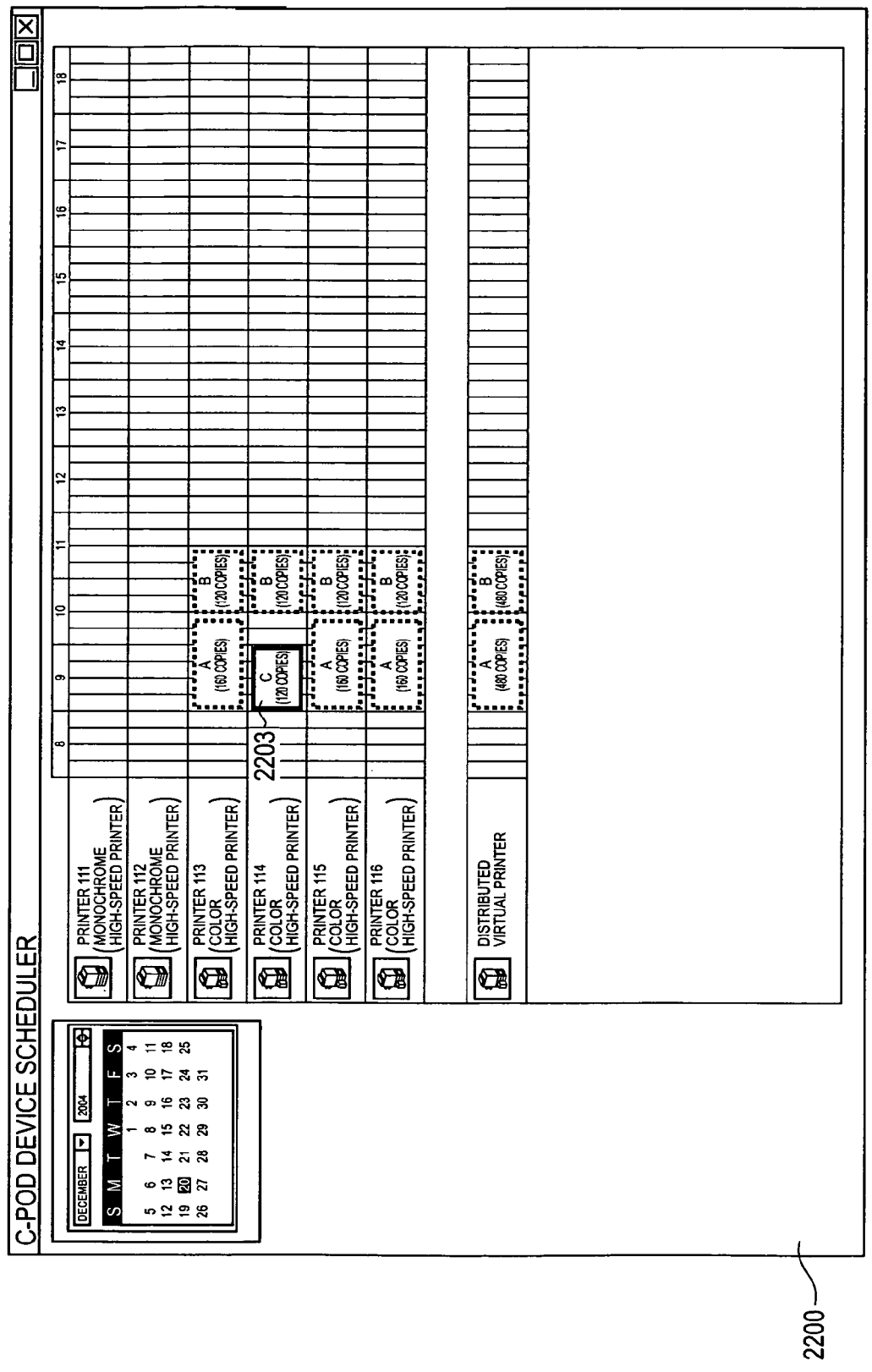
FIG. 22 illustrates still yet another exemplary scheduler UI corresponding to a work schedule produced by the schedule server according to an embodiment of the present invention.

FIGS. 21 and 22 illustrate the transition in a screen when an order assigned to a reservation time to which a virtual order is already assigned is dragged and dropped onto a real printer (here, the reservation time is May 12th, 9:00 am). FIG. 23 illustrates the schedule information of the printer 114, shown in FIG. 21, stored in the RAM 202.

In FIG. 21, a virtual order A (480 copies) 2101 and a virtual order B (480 copies) 2102 are dragged and dropped onto a distributed virtual printer 2103 on a schedule UI 2100. One hundred and twenty copies each of the virtual orders A and B are distributed and reserved among the printers 113 to 116. At this time, if an order C 2104 for 120 copies is dragged and dropped onto the real printer 114 and a reservation time "May 12th, 9:00 to 10:30" is set using the setting UI, shown in FIG. 25, the scheduler 1202 refers to the schedule information for the RAM 114, shown in FIG. 23, that is stored in the RAM 202.

By referring to the stored information, shown in FIG. 23, the scheduler 1202 determines that the virtual order A is scheduled for "May 12th, 9:00 to 10:30" and confirms that the priority of the virtual order A is set to "low priority" since it is a virtual order. Since the order C directly dropped onto the real printer 114 is set to "high priority" as described above, the 1202 determines that the order C is given higher priority than the order A. Accordingly, the scheduler 1202 changes the schedules of the virtual orders A and B as shown in FIG. 22.

FIG. 22 shows another screen 2200 of an exemplary scheduler UI. In FIG. 22, the order C 2203 is set as a priority order. In response, the order A 2105 (from FIG. 21) assigned for the printer 114 is cancelled, and the cancelled order A 2105 is additionally distributed 40 copies to the other printers 113, 115, and 116. As a result, the processing time of the printers 113, 115, and 116 are postponed, and the starting time of the virtual order B is also postponed. The schedule information of the real printer 114 after scheduling the order C 2104 is illustrated in FIG. 24. More specifically, before the order C 2104 is scheduled, the RAM 202 stores information indicating that the order A is to processed from 9:00 to 10:00. However, after the order C is dropped onto the real printer 114, the order C is assigned to the reservation time "9:00 to 10:30," and the priority of the order C is compared to the priority of the order A assigned to the time to which the order C is also to be assigned. Since the order C is directly dropped onto the real printer 114, its priority is set to "high" and, thus, is scheduled so that it is assigned to the real printer 114 at the reservation time with priority over the order A. As a result, the information stored in the RAM 202 is changed as shown in FIG. 24.

As shown in FIGS. 21 and 22, the orders are displayed along a time line provided for each image forming apparatus (printer) on the scheduler UI. The schedule of the orders may be changed by selecting an image forming job and moving it to a predetermined position on the scheduler UI.

As described above, by employing the method according to the present invention to a process management apparatus configured to carry out operation scheduling related to printing when a printing job is received, orders can be dropped onto a distributed virtual printer and can be easily scheduled. Orders scheduled by dropping the order onto a distributed virtual printer on a schedule UI and an order scheduled by dropping the order onto a real printer on a schedule UI can be automatically set at different priority level, and order interruption and scheduling in accordance to the order's priority level can be automatically carried out. In this way, schedule management according to the user's intention can be carried out through easy operation.

The present invention may also be achieved by supplying a software program configured to realize the functions according to the embodiments of the present invention (i.e., a program corresponding to the process illustrated in the flow charts according to the embodiments) directly or remotely to a system or an apparatus and reading out the supplied program code with the system or apparatus.

According to the present invention, a schedule for an image forming job can be easily changed so that schedule management according to the user's intention can be carried out through easy operation.

Accordingly, the program code installed in a computer for realizing the functions of the present invention are also considered an embodiment of the present invention. In other words, the present invention includes a computer program for realizing the functions of the present invention.

The configuration of the program according to the present invention is not limited and may be an object code, a program processed with an interpreter, script data supplied to an OS.

As a medium for supplying a program may be a flexible disk, a hard disk, an optical disk, a magneto-optical disk, a MO, a CD-ROM, a CD-R, a CD-RW, magnetic tape, a nonvolatile memory card, a ROM, a DVD (DVD-ROM and DVD-R).

Other methods for supplying a program may include a method of connecting an Internet website using a browser program of a client computer and downloading the computer program or a file including a compressed file having an automatic installation function from the website to a recording medium, such as a hard disk. Moreover, the program code according to the present invention may be divided into a plurality of files and be downloaded from different websites. In other words, a World Wide Web (WWW) server allowing a plurality of users to download program files for realizing the functions according to the present invention using a computer is also included in the scope of the present invention.

It is also possible to store an encrypted program according to the present invention on a recording medium, such as a CD-ROM, allow a user who meets predetermined conditions to download a key for decrypting the program from a website via the Internet, and then allow the user to install the program in a computer to realize the function according to the embodiments of the present invention.

The above-described functions may be realized by executing the program read out by a computer. In addition to such a case, an OS operating on a computer may carry out part and all of the actual processing in accordance with instructions based on the program to realize the functions of the embodiments of the present invention. Such a case is also included in the scope of the present invention.

A program read out from a recording medium may be written in a memory included in a function expansion board installed in a computer or a function expansion unit connected to the computer so that an OS operating on a computer may carry out part and all of the actual processing in accordance with instructions based on the program to realize the functions of the embodiments of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-171530 filed Jun. 10, 2005, which is hereby incorporated by reference herein in its entirety.

What is claimed is:

1. An image forming job management apparatus comprising:
   a schedule displaying unit configured to display a schedule screen including a schedule of an image forming apparatus and a schedule of a group which is composed of a plurality of image forming apparatuses;
   a print job managing unit configured to, when new print job information is dragged onto identification information of the image forming apparatus on the schedule screen, temporarily display a schedule indicating processing time to process new print job information in the image forming apparatus;
   a print job manager configured to set a high-priority level for the schedule of the new print job information in accordance with dropping the dragged new print job information onto the identification information of the image forming apparatus on the schedule screen, and to set a low-priority level for the schedule of the new print job information in accordance with dropping the dragged new print job information onto the identification information of the group on the schedule screen; and
   a scheduler configured to process the schedule for which the high-priority level is set prior to the schedule for which the low-priority level is set,
   wherein the schedule displaying unit displays the schedule generated by dropping the new print job information onto the identification information of the image forming apparatus and the schedule generated by dropping the new print job information onto the identification information of the group so as to be distinguishable from each other.

2. An image forming job management method comprising:
   displaying a schedule screen including a schedule of an image forming apparatus and a schedule of a group which is composed of a plurality of image forming apparatuses;
   temporarily displaying a schedule indicating processing time to process new print job information in the image forming apparatus, when new print job information is dragged onto identification information of the image forming apparatus on the schedule screen;
   setting a high-priority level for the schedule of the new print job information in accordance with dropping the dragged new print job information onto the identification information of the image forming apparatus on the schedule screen, and setting a low-priory level for the schedule of the new print job information in accordance with dropping the dragged new print job information onto the identification information of the group on the schedule screen; and
   processing the schedule for which the high-priority level is set prior to the schedule for which the low-priority level is set,
   displaying the schedule generated by dropping the new print job information onto the identification information of the image forming apparatus and the schedule generated by dropping the new print job information onto the identification information of the group so as to be distinguishable from each other.

3. A non-transitory computer readable storage medium which stores a program for causing a computer to execute a method comprising:
   displaying a schedule screen including a schedule of an image forming apparatus and a schedule of a group which is composed of a plurality of image forming apparatuses;
   temporarily displaying a schedule indicating processing time to process new print job information in the image forming apparatus, when new print job information is dragged onto identification information of the image forming apparatus on the schedule screen;
   setting a high-priority level for the schedule of the new print job information in accordance with dropping the dragged new print job information onto the identification information of the image forming apparatus on the schedule screen, and setting a low-priority level for the schedule of the new print job information in accordance with dropping the dragged new print job information onto the identification information of the group on the schedule screen; and
   processing the schedule for which the high-priority level is set prior to the schedule for which the low-priority level is set,
   displaying the schedule generated by dropping the new print job information onto the identification information of the image forming apparatus and the schedule generated by dropping the new print job information onto the identification information of the group so as to be distinguishable from each other.

* * * * *